United States Patent
Kim et al.

(10) Patent No.: US 6,169,717 B1
(45) Date of Patent: Jan. 2, 2001

(54) APPARATUS AND METHOD FOR FULL PERIOD COMPENSATION IN AN OPTICAL DISK READER

(75) Inventors: Je-kook Kim, Seoul; Jeong-cheol Shin, Suwon; Young-wook Jang, Yongin, all of (KR)

(73) Assignee: Samsung Electronics Co., Ltd. (KR)

(*) Notice: Under 35 U.S.C. 154(b), the term of this patent shall be extended for 0 days.

(21) Appl. No.: 09/119,087

(22) Filed: Jul. 20, 1998

(30) Foreign Application Priority Data

Jul. 21, 1997 (KR) .................................................. 97-34004

(51) Int. Cl.[7] ....................................................... G11B 7/00
(52) U.S. Cl. ................................................ 369/59; 369/47
(58) Field of Search .................................. 369/59, 47, 48, 369/49, 50, 54, 58, 32; 360/48, 51, 53, 39

(56) References Cited

U.S. PATENT DOCUMENTS 5,532,991 * 7/1996 Sasaki ................................. 369/54 X
5,761,171 * 6/1998 Tobita ................................. 369/50 X

* cited by examiner

*Primary Examiner*—Muhammad Edun
(74) *Attorney, Agent, or Firm*—Samuels, Gauthier & Stevens, LLP

(57) ABSTRACT

An optical disk reading apparatus and method compensate for errors in the full period of an EFM signal. An RF amplifier converts an optical signal reflected from an optical disk into an analog electrical signal. A signal converter converts the analog signal into a digital signal which is modulated to provide an EFM signal. A full period compensating portion compensates for full period errors in the EFM signal and outputs the error compensated EFM signal. An error correcting portion corrects the errors of the compensated EFM signal using an error correction code. Image quality is improved by removing the full period errors.

27 Claims, 20 Drawing Sheets

APPARATUS AND METHOD FOR FULL PERIOD COMPENSATION IN AN OPTICAL DISK READER

BACKGROUND OF THE INVENTION

In general, there are several forms of optical disk systems in use today, including: a DVD system, such as a digital video (or versatile) disk system, a DVD-ROM system, a DVD-RAM system, and a compact disk (CD) system, such as a compact disk player (CDP) system or a CD-ROM system.

In a conventional optical disk reading apparatus, picture quality is adversely affected when the optical disk is scratched or when there is a manufacturing defect in the optical disk. Although digital signal processor (DSP) circuits employing error correction attempt to cure such defects, their applications are somewhat limited.

Data is commonly stored on an optical disk in holes, or pits and is modulated according to standard formats, for example the widely-used eight-to-fifteen modulation (EFM). In a defective, or non-standard, optical disk, in particular, a coarsely-copied optical disk, the depth of a pit does not meet standards. Accordingly, the level of an optical signal reflected from the optical disk is considerably lowered. Furthermore, the level becomes even lower as the speed of the optical disk increases. Accordingly, an error exists in the full period T' of the EFM signal. In the CDP, since the full period of a normal disk is 693 ns, but the full period of a coarse disk is 550 ns–650 ns, in the case of 3T (where T denotes the period of the reference clock signal), T' deviates from a sampling error margin range. Therefore, when a data slice is performed in an EFM comparator, it is difficult to estimate a correct amount of asymmetry offset.

In a conventional optical disk reading apparatus, the EFM full period error is corrected using an error correction code, a radio frequency (RF) equalizer or an RF automatic gain controller. However, the conventional forms of correction suffer from several shortcomings which limit the effectiveness of error correction.

SUMMARY OF THE INVENTION

To solve the above problem, it is an object of the present invention to provide an optical disk reading apparatus and method having a function of compensating for full period error in an EFM signal.

Accordingly, the inventive apparatus provides an optical disk reading apparatus adapted for a full period error compensation, comprising an RF amplifying means for converting an optical signal reflected from an optical disk into an electrical signal, a signal converting means for converting the analog electrical signal into a digital signal and outputting the converted digital signal as a modulated signal, for example an EFM signal, a full period compensating means for compensating for the errors of the full periods of the EFM signal and outputting the error compensated EFM signal as a compensated EFM signal, and an error correcting means for correcting the errors of the compensated EFM signal using an error correction code.

The inventive method provides a method of operating an optical disk reading apparatus having a full period compensating function, comprising the steps of (a) converting an optical signal reflected from an optical disk into an electrical signal, (b) obtaining a modulated signal, for example an EFM signal, by converting the analog electrical signal into a digital signal, (c) obtaining a compensated EFM signal by compensating for errors of the full periods of the EFM signal, and (d) correcting the errors of the compensated EFM signal using an error correcting code.

BRIEF DESCRIPTION OF THE DRAWINGS

The foregoing and other objects, features and advantages of the invention will be apparent from the more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF PREFERRED EMBODIMENTS

Figure 1:
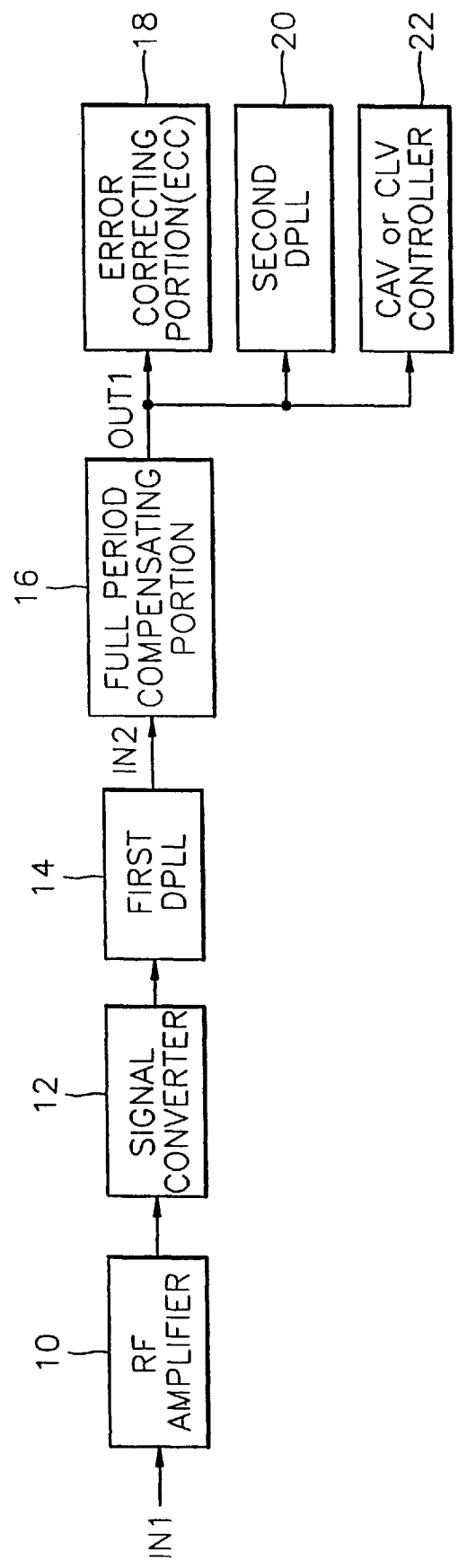
FIG. 1 is a block diagram of an optical disk reading apparatus having a full period compensating function, according to the present invention.

FIG. 1 is a block diagram of an optical disk reading apparatus having a full period compensation function, according to the present invention. The optical disk reading apparatus includes an RF amplifier 10, a signal converter 12, a full period compensating portion 16, and an error correcting portion 18. The optical disk reading apparatus further optionally includes a first digital phase locked loop (DPLL) 14, a second DPLL 20, and a constant linear velocity (CLV) or constant angular velocity (CAV) controller 22.

Figure 2:
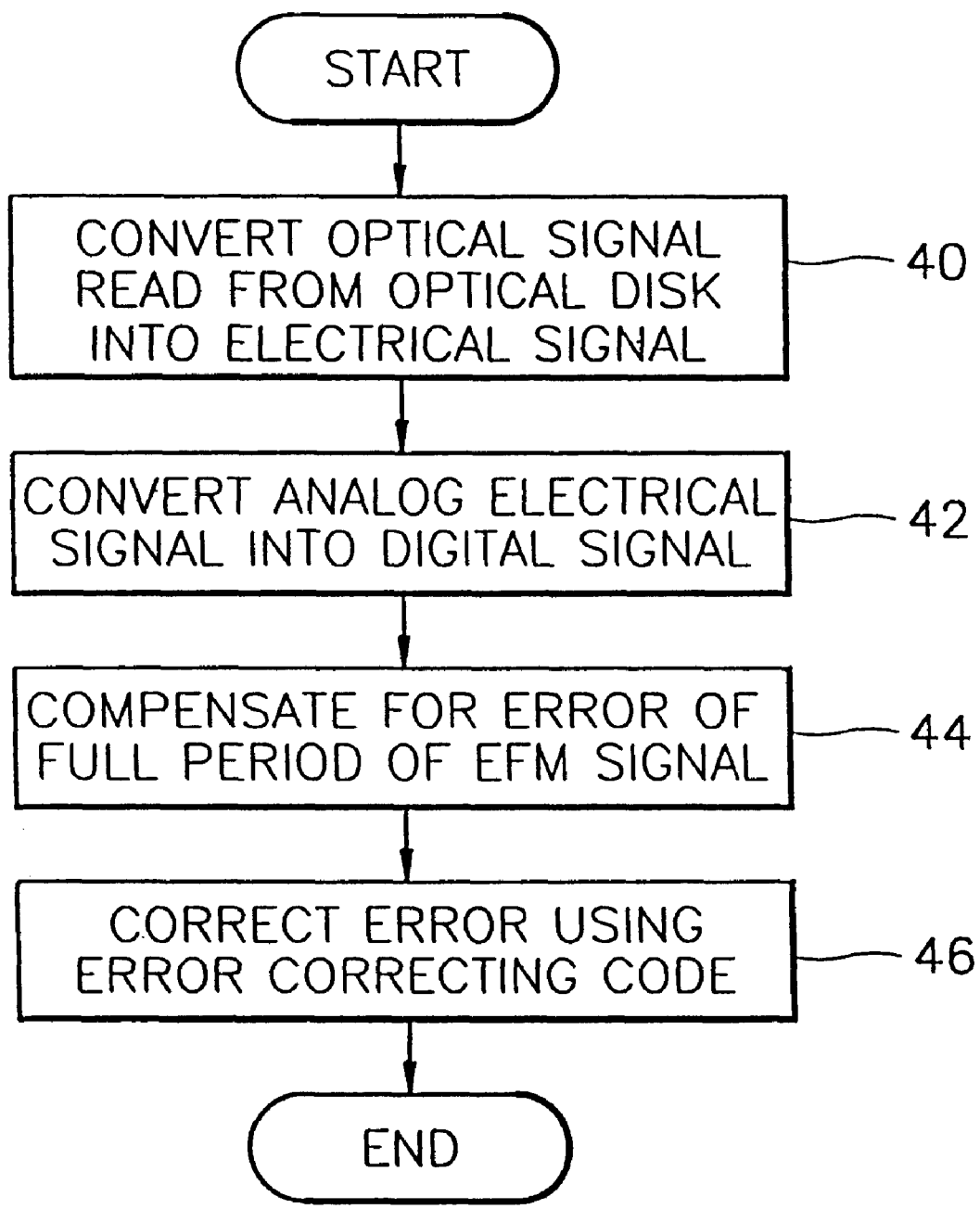
FIG. 2 is a flowchart describing a method for operating the optical disk reading apparatus having the function of compensating for the full period, shown in FIG. 1.

FIG. 2 is a flowchart describing a method for operating the optical disk reading apparatus shown in FIG. 1 having the function of compensating for the full period, according to the present invention. The method includes the steps of obtaining an EFM signal (steps 40 and 42) and performing error correction after compensating for the full period (steps 44 and 46).

The RF amplifier 10 shown in FIG. 1 receives an optical signal reflected from the optical disk through an input terminal IN 1 and converts the signal into an electrical signal (step 40 of FIG. 2). Following this, the signal converter 12 receives the analog electrical signal, converts it into a digital signal, and outputs the converted digital signal to a full period compensating portion 16 as the EFM signal (step 42). At this time, the EFM signal output from the signal converter 12 can be input to the full period compensating portion 16 through the first DPLL 14, as shown in FIG. 1. The first DPLL 14 synchronizes a clock signal output from a crystal oscillator (not shown), with the EFM signal and outputs the synchronized signal as a master clock signal, and outputs the EFM signal synchronized with the generated master clock signal to the full period compensating portion 16. Since the EFM signal is synchronized with the crystal clock signal before the full period error of the EFM signal is compensated. This allows for an increase in error margin rate.

Following step 42, the full period compensating portion 16 compensates for the error in the full period of the EFM signal output from the signal converter 12 or the first DPLL 14, and outputs the compensated EFM signal (step 44).

Following step 44, a demodulating portion (not shown) receives and demodulates the compensated EFM signal. The error correcting portion (ECC) 18 corrects errors in the demodulated EFM signal using error correcting codes (step 46).

In addition to being processed by the ECC portion 10, the compensated EFM signal is output through the demodulating portion to the second DPLL 20 or the CAV or CLV controller 22. The second DPLL 20 performs the same operation as the first DPLL 14; namely, synchronization of the EFM signal with the master clock signal. The CAV or CLV controller 22 employs the compensated EFM signal to control the rotation of the optical disk to a constant angular velocity or a constant linear velocity.

Figure 3:
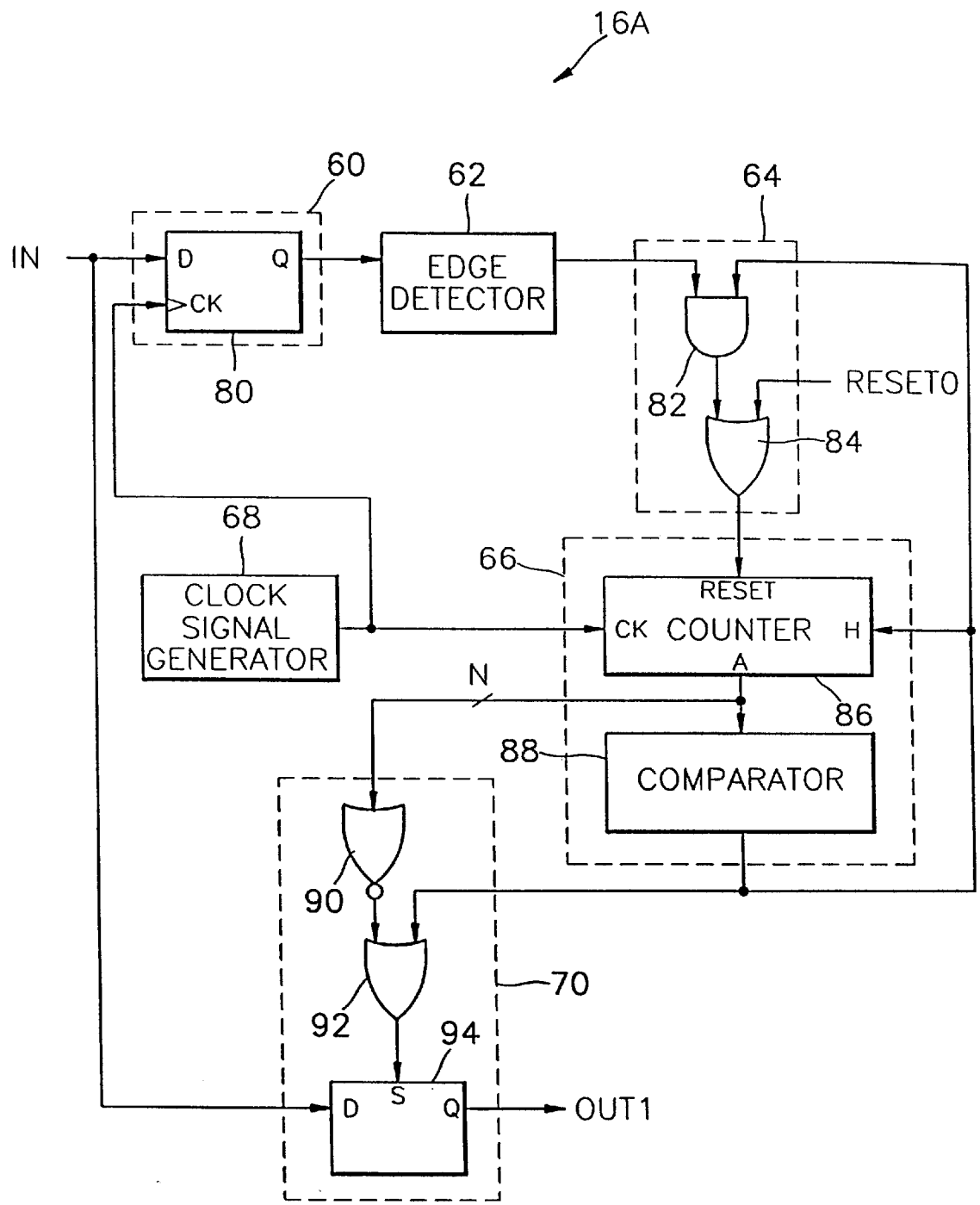
FIG. 3 is a circuit diagram of a preferred first embodiment of a full period compensating portion shown in FIG. 1.

FIG. 3 is a circuit diagram of a preferred embodiment of the full period compensating portion 16 shown in FIG. 1.

The preferred embodiment 16A includes a D flip-flop 80 for realizing a noise removing portion 60, an edge detector 62, an AND gate 82 and an OR gate 84 for realizing a reset signal generator 64, a counter 86 and a comparator 88 for realizing a counting portion 66, a clock signal generator 68, and a NOR gate 90, an OR gate 92 and a latch 94 for realizing a latching portion 70.

Figure 4:
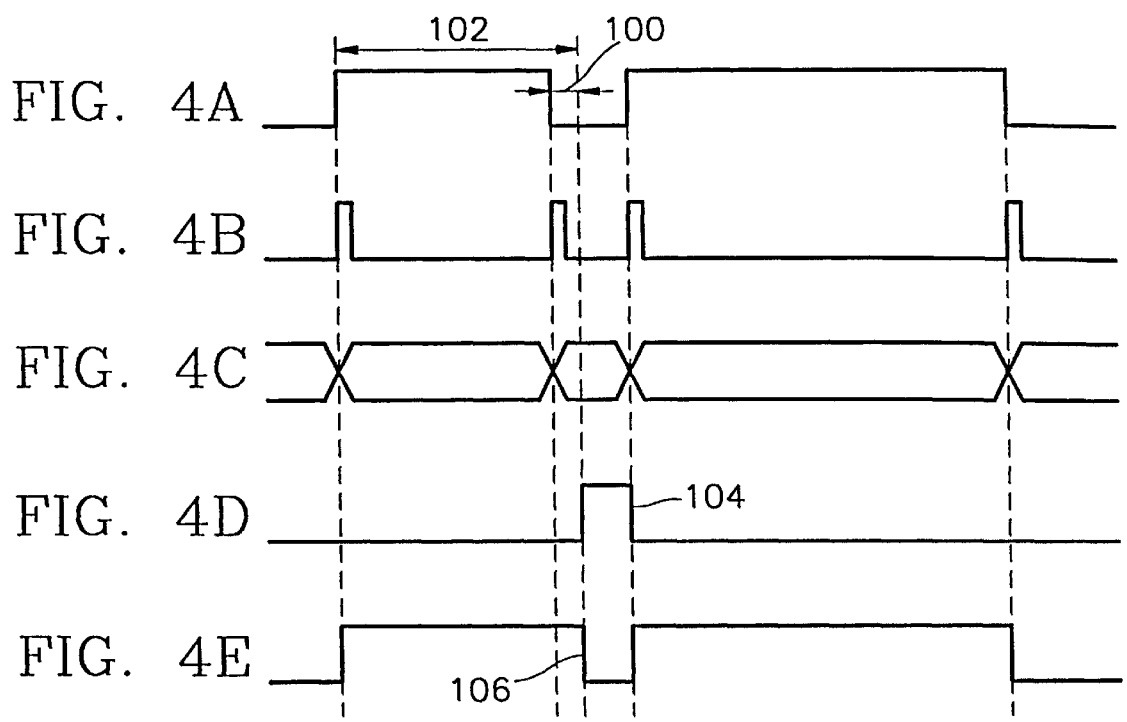
FIGS. 4A through 4E are timing diagrams illustrating waveforms at various nodes of the full period compensating portion shown in FIG. 3.

FIGS. 4A through 4E show waveforms of certain signals of the full period compensating portion 16 shown in FIG. 3. FIG. 4A shows the waveform of the EFM signal input through the input terminal IN2 or output from the noise removing portion 60. FIG. 4B shows the waveform of a rising edge signal and a falling edge signal as processed by the edge detector 62. FIG. 4C shows the waveform of a counted value (A) output from the counter 86. FIG. 4D shows a waveform of a counting termination signal output from the comparator 88. FIG. 4E shows the waveform of the compensated EFM signal output from the latching portion 70.

The noise removing portion 60 shown in FIG. 3 removes noise from the edges of the EFM signal by receiving the EFM signal through the input terminal IN2 and outputting the input EFM signal to the edge detector 62 in response to the counting clock signal. For this, the D flip-flop 80 receives the EFM signal as a data input (D) and the counting clock signal as a clock input (CK) and outputs the noise-free EFM signal shown in FIG. 4A to the edge detector 62 through a positive output terminal (Q).

The edge detector 62 detects the rising and falling edges of the EFM signal shown in FIG. 4A, input from the noise removing portion 60, and generates the rising and falling edge signals shown in FIG. 4B. The edge signals are sent to the AND gate 82 of the reset signal generator 64, according to whether the rising and falling edges are detected.

The reset signal generator 64 outputs a reset signal in response to the rising edge signal, falling edge signal and the counting termination signal, or an initial reset signal (RESETO). For this, the AND gate 82 performs an AND operation on the rising and falling edge signals and the counting termination signal shown in FIG. 4D, and outputs the AND operation result to the OR gate 84. The OR gate 84 performs an OR operation on the output of the AND gate 82 and the initial reset signal (RESETO), and outputs the OR operation result as a reset signal to the reset terminal (RESET) of the counter 86.

The counting portion 66 is reset in response to the reset signal output from the OR gate 84, and counts clock signals up to a first predetermined number. When counting is completed, the counting portion 66 generates the counting termination signal shown in FIG. 4D indicating that the counting is terminated, and sends that signal to the reset signal generator 64 and the latching portion 70. The counter 86 of the counting portion 66 is initialized in response to the reset signal input to the reset terminal (RESET), counts N bits in response to the counting clock signal output from the clock signal generator 68 and input to the clock terminal (CK). The counted value is held in response to the counting termination signal input to the hold terminal (H), and the counted result (A) shown in FIG. 4C is output to the comparator 88 and the latching portion 70. The comparator 88 compares the result (A) counted by the counter 86 with a first predetermined number and outputs the counting termination signal shown in FIG. 4D to the hold terminal (H) of the counter 86, the AND gate 82 of the reset signal generator 64, and the OR gate 92 of the latching portion 70, in response to the comparison result.

The latching portion 70 outputs the original EFM signal shown in FIG. 4A or the compensated EFM signal shown in FIG. 4E which is previously latched, as a compensated EFM signal, in response to the counting termination signal shown in FIG. 4D or the counted value (A) shown in FIG. 4C. For this, the NOR gate 90 performs a NOR operation on the N bits (A) counted by the counter 86, and outputs them. The OR gate 92 performs an OR operation on the output of the NOR gate 90 and the counting termination signal, and outputs the OR operation result to a latch 94 as a selection signal. The latch 94 outputs the EFM signal latched in response to the selection signal input to a selection terminal (S), through an output terminal OUT1.

Figure 5:
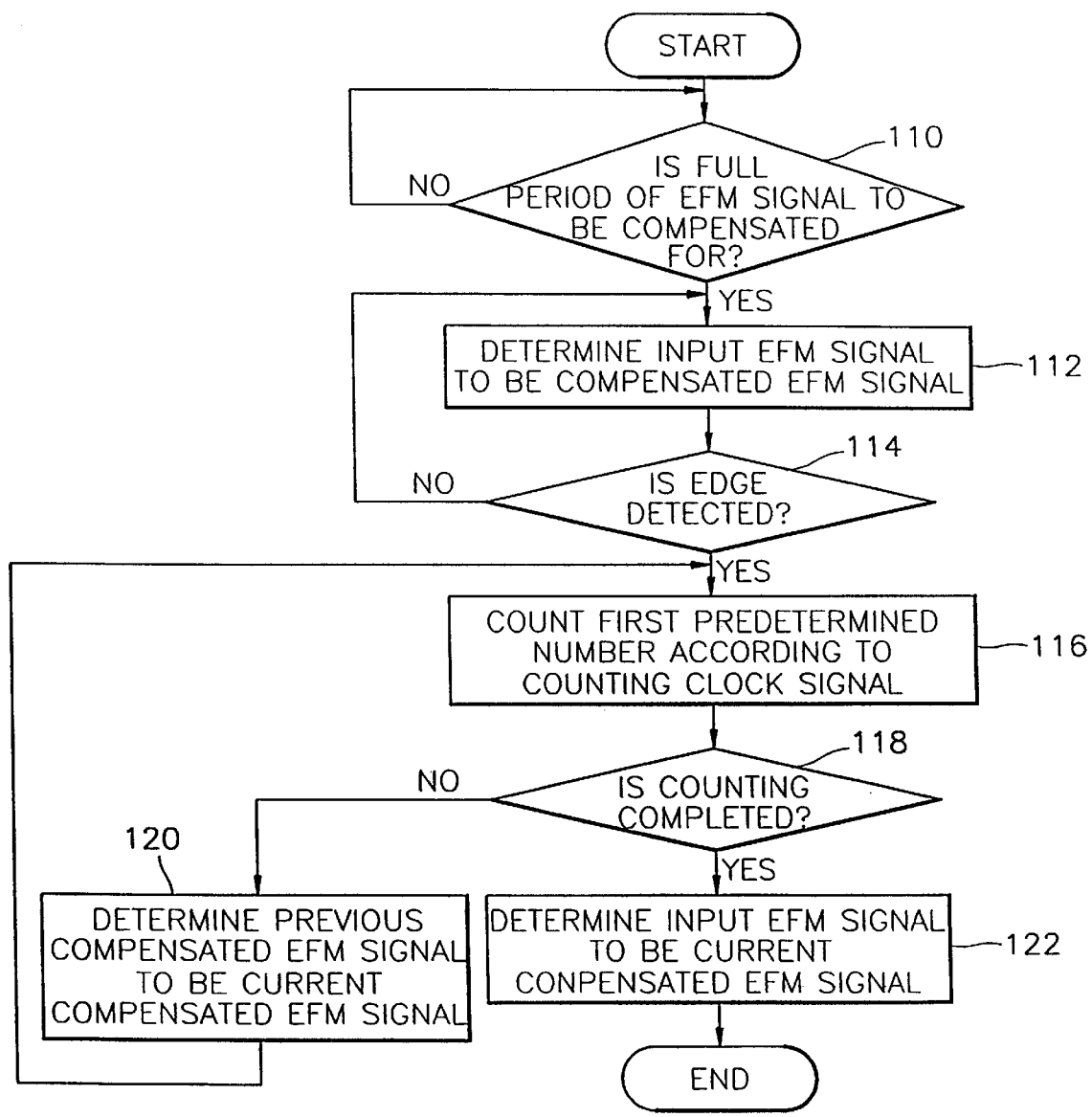
FIG. 5 is a flowchart describing a method for compensating for the full period according to the present invention, performed by the full period compensating portion shown in FIG. 3.

FIG. 5 is a flowchart describing the full-period compensation method according to the present invention, performed by the full period compensating portion 16A of FIG. 3. The method includes the steps of preparing to compensate for the full period (step 110), performing counting or compensating for the full period, corresponding to the detected edge (steps 112 through 116), and determining the compensated EFM signal, corresponding to whether the counting is completed (steps 118 through 122).

The full period compensating portion 16A shown in FIG. 3 first prepares to compensate for the full period of the EFM signal (step 110). For this, it is determined whether the full period of the EFM signal will be compensated for (step 110). Namely, the reset signal generator 64 monitors the initial reset signal (RESET0), and when a reset is received, the currently input EFM signal shown in FIG. 4A is determined to be the compensated EFM signal (step 112). Since the counter 86, initialized in response to the reset signal generated by the reset signal generator 64, outputs its initial value to the NOR gate 90 as the counted value (A), the latch 94 latches the input EFM signal IN2 as the compensated EFM signal. At this time, the counter 86 begins counting after being reset and outputs the counted value to the comparator 88. The comparator 88 outputs the counting termination signal to the AND gate 82, the hold terminal (H) of the counter 86, and the OR gate 92, when the counted value reaches the first predetermined number.

Following step 112, it is determined whether the rising or falling edge of the EFM signal shown in FIG. 4A is detected by the edge detector 62 (step 114). When the rising or falling edge is not detected and the counted value is equal to the first predetermined number, a counting termination signal of a "high" logic level is continuously generated by the comparator 88. Accordingly, the compensated EFM signal previously latched by the latch 94 is output through the output terminal OUT1 as the currently compensated EFM signal. However, when the rising or falling edge of the EFM signal is detected, the counting portion 66 begins to count signals generated by the counting clock signal output from the clock signal generator 68 (step 116).

For example, assume the edge detector 62 receives an EFM signal having a full period 102 in which the error 100 shown in FIG. 4A exists, via the input terminal IN2. The signal is processed by the noise removing portion 60, which detects the edge of the input EFM signal, and outputs the rising and falling edge signals shown in FIG. 4B to the AND gate 82. Therefore, the OR gate 84 performs an OR operation on the output of the AND gate 82 of a "high" logic level and the initial reset signal (RESET0) of a "low" logic level and outputs the OR operation result of the reset signal of a "high" logic level to the counter 86. Accordingly, the counter 86 is initialized. At this time, since the counted value (A) has a "low" logic level in an initial stage, the latch 94 outputs the EFM signal, input through the input terminal IN2 and shown in FIG. 4A, through the output terminal OUT 1. Then, the counter 86 starts counting and outputs the counted value (A) to the comparator 88.

Comparator 88, determines whether counting has completed (step 118). When counting has not yet completed, since the counter 86 continuously performs counting, a selection signal(s) of a "low" logic level is generated at latch 94. Accordingly, the latch 94 outputs the previous compensated EFM signal (step 120), previously latched and shown in FIG. 4E, as the current compensated EFM signal, and the method proceeds to step 116. When counting has completed, namely, when the counted value (A) is equal to the first predetermined number, the comparator 88 generates a counting termination signal 104 of a "high" logic level shown in FIG. 4D, and accordingly, the latch 94 outputs the EFM signal, input to the data input terminal (D) through the input terminal IN2, as the current compensated EFM signal, through the output terminal OUT1 (step 122). Therefore, the EFM signal having its level changed from a "high" logic level to a "low" logic level (106) is output through the output terminal OUT1 as the current compensated EFM signal as shown in FIG. 4E.

The edge detector 62 shown in FIG. 3 can be realized as follows in order to detect an edge of the EFM signal. Other embodiments are equally applicable.

Figure 6A:
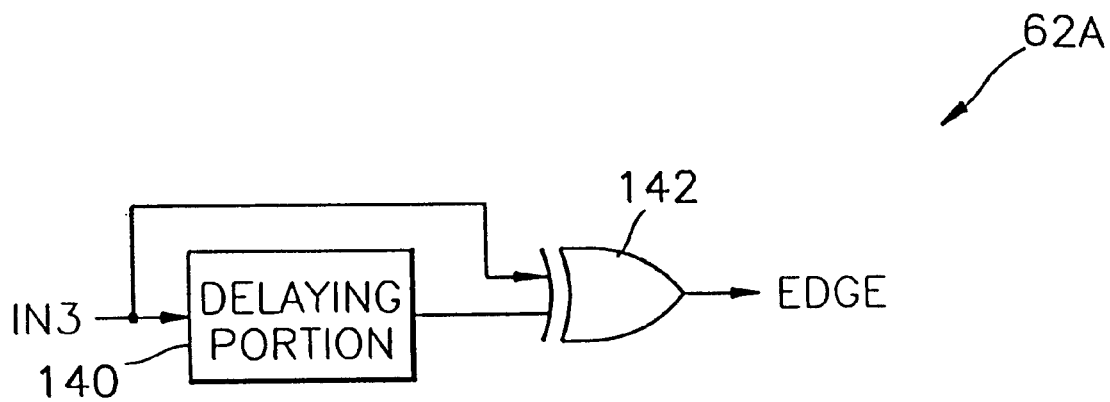
FIGS. 6A and 6B are circuit diagrams of an edge detector shown in FIG. 3.
Figure 6B:
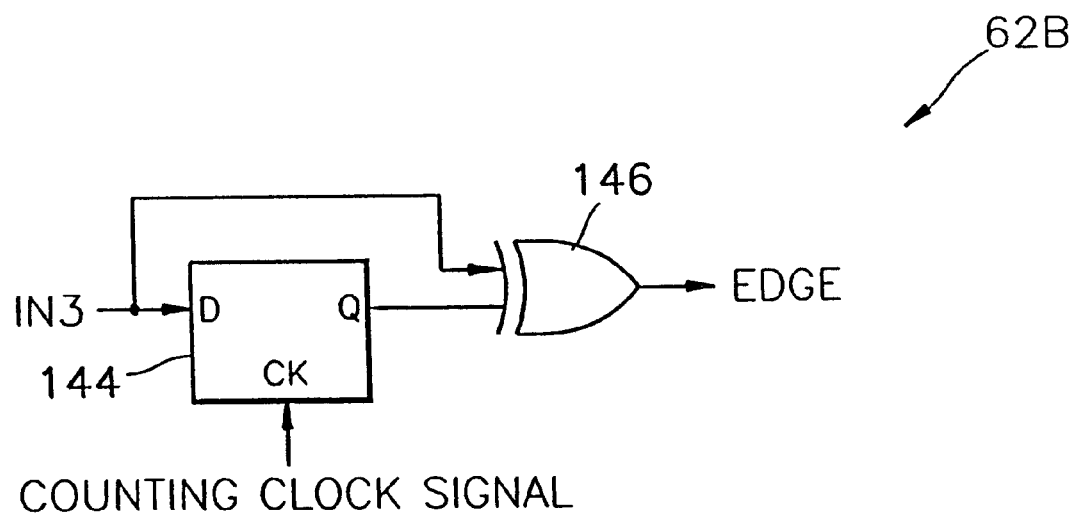

FIGS. 6A and 6B are circuit diagrams of the edge detector 62 shown in FIG. 3. An edge detector 62A shown in FIG. 6A is comprised of a delaying portion 140 and an XOR gate 142. An edge detector 62B shown in FIG. 6B is comprised of a D flip-flop 144 and an XOR gate 146.

The delaying portion 140 shown in FIG. 6A delays the EFM signal input through an input terminal IN3 for a predetermined time, and outputs the delayed EFM signal to the XOR gate 142. The XOR gate 142 performs an exclusive OR operation on the EFM signal delayed by the delaying portion 140 and the EFM signal which is not delayed, and outputs the result as the rising or falling edge signal (EDGE).

The D flip-flop 144 shown in FIG. 6B outputs the EFM signal input to the data terminal (D) through the input terminal IN3, to the XOR gate 146 through the positive output terminal (Q) in response to the counting clock signal input to the clock terminal (CK). The XOR gate 146 performs an exclusive OR operation on the EFM signal output through the positive output terminal (Q) and the EFM signal input through the input terminal IN3, and outputs the exclusive OR operation result as the rising or falling edge signal (EDGE).

Figure 7:
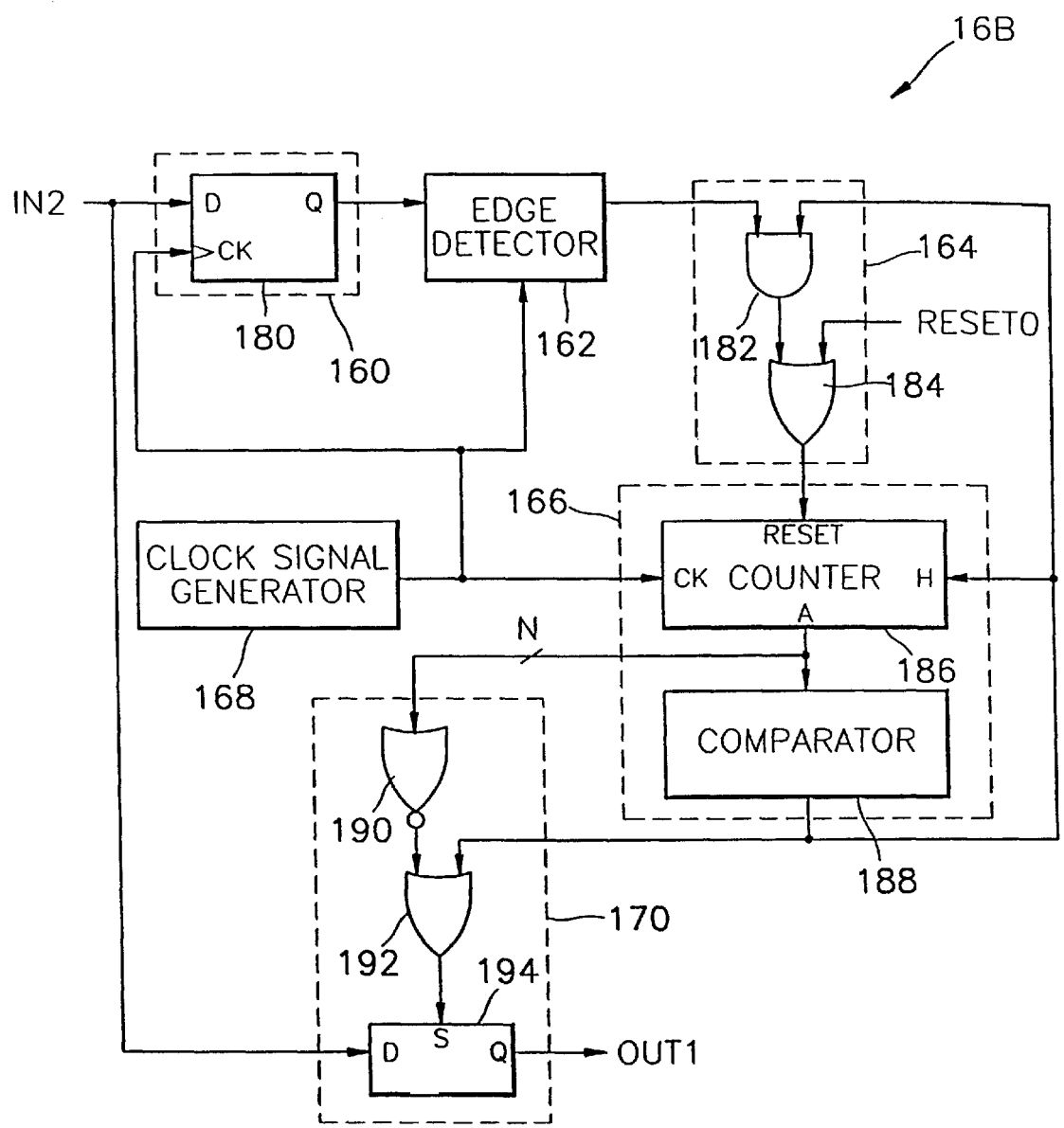
FIG. 7 is a circuit diagram of the full period compensating portion of FIG. 1, according to a second embodiment of the present invention.

FIG. 7 is a circuit diagram of the full period compensating portion 16 shown in FIG. 1, according to an alternative embodiment of the present invention. The full period compensating portion 16B includes a D flip-flop 180 for realizing a noise removing portion 160, an edge detector 162, an AND gate 182 and an OR gate 184 for realizing a reset signal generator 164, a counter 186 and a comparator 188 for realizing a counting portion 166, a clock signal generator 168, a NOR gate 190, an OR gate 192 and a latch 194 for realizing a latching portion 170.

While the full period compensating portion 1 6A shown in FIG. 3 is suitable for using the circuit shown in FIG. 6A as the edge detector 62, the full period compensating portion 16B shown in FIG. 7 is suitable for using the circuit shown in FIG. 6B as the edge detector 162. Namely, the full period compensating portion 166B shown in FIG. 7 has the same structure and performs the same function as the full period compensating portion 16A shown in FIG. 3, except that the edge detector 162 of FIG. 7 detects the edge of the EFM signal using the counting clock 168 signal.

The full period compensating portion 16A or 16B shown in FIG. 3 or 7 is suitable for compensation of the error 100 of a full period 102 shown in FIG. 4A when the error 100 of the full period 102 of the EFM signal is less than 0.5T (T is the period of the reference frequency clock signal).

The above-mentioned first predetermined number is preferably a value not more than 3T/T"–10T/T" (where T" is the period of the counting clock signal) in a CD system, and a value not more than 3T/T"–11T/T" in a DVD system. If the first predetermined number is not more than 3T/T", the full period compensating portion 16A or 16B shown in FIG. 3 or 7 can compensate the error of the full period 3T. Namely, when the full period T' of the EFM signal input through the input terminal IN2 is 2.55T–2.99T, the full period compensating portion compensates the full period (T') of the EFM signal to 3T. For example, when one period (1T") of the counting clock signal is 29.5 ns and the above full period compensating portion 16 is used in the CD system, since the length of 3T is 693 ns, the first predetermined number can be set to 23 or a value less than 23.

Figure 8:
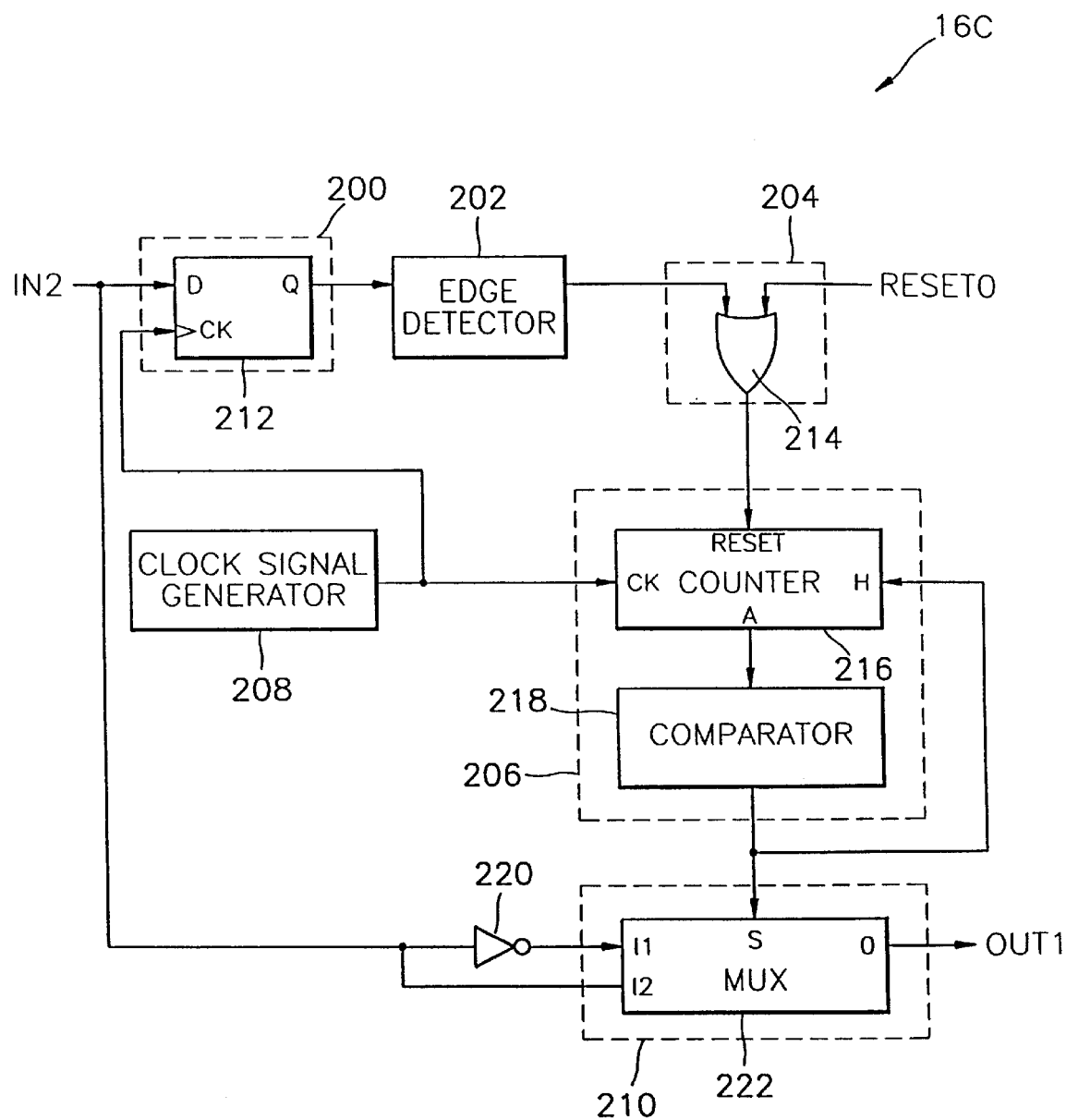
FIG. 8 is a circuit diagram of the full period compensating portion of FIG. 1, according to a third embodiment of the present invention.

FIG. 8 is a circuit diagram of the full period compensating portion 16 shown in FIG. 1, according to a third embodiment of the present invention. The full period compensating portion 16C is comprised of a D flip-flop 212 for realizing a noise removing portion 200, an edge detector 202, an OR gate 214 for realizing a reset signal generator 204, a counter 216 and a comparator 218 for realizing a counting portion 206, a clock signal generator 208, an inverter 220, and a multiplexer (MUX) 222 for realizing a signal selecting portion 210.

Figure 9:
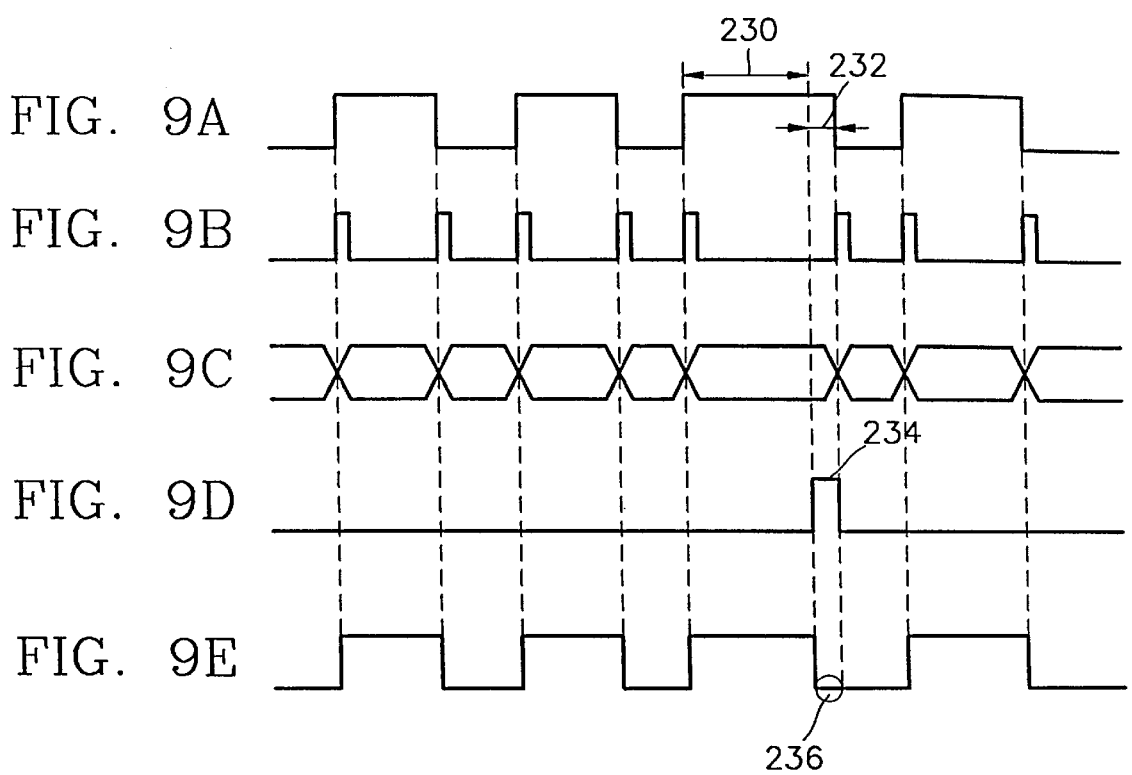
FIGS. 9A through 9E are timing diagrams illustrating waveforms at various nodes of the full period compensating portion shown in FIG. 8.

FIGS. 9A through 9E show waveforms of the portions of the full period compensating portion 16C shown in FIG. 8. FIG. 9A shows the waveform of the EFM signal input through the input terminal IN2 or output through the noise removing portion 200. FIG. 9B shows waveforms of the rising edge and falling edge signals generated by edge detector 202. FIG. 9C shows the waveform of the counted value (A) output from the counter 216. FIG. 9D shows the waveform of the counting termination signal output from the comparator 218. FIG. 9E shows the waveform of the compensated EFM signal output from the signal selecting portion 210 through the output terminal OUT1.

The noise removing portion 200 shown in FIG. 8 removes the noise of the edge of the EFM signal by receiving EFM signal through the input terminal IN2 and outputting the input EFM signal to the edge detector 202 in response to the counting clock signal. For this, the D flip-flop 212 outputs the EFM signal shown in FIG. 9A in which the noise of the edge is removed, through the positive output terminal (Q) to the edge detector 202, by receiving the EFM signal through the data terminal (D) and receiving the counting clock signal through the clock terminal (CK).

The edge detector 202 detects the rising edge and falling edge of the EFM signal shown in FIG. 9A input from the noise removing portion 200, and outputs the rising and falling edge signals shown in FIG. 9B to the reset signal generator 204.

The reset signal generator 204 outputs the reset signal in response to the rising and falling edge signals or the initial reset signal (RESET0). For this, the OR gate 214 performs an OR operation on the initial reset signal (RESET0) and the rising and falling edge signals shown in FIG. 9B, and outputs the OR operation result to the reset terminal (RESET) of the counter 216 as the reset signal.

The counting portion 206 is reset in response to the reset signal output from the OR gate 214, counts to a second predetermined number and outputs the counting termination signal shown in FIG. 9D, indicating that the counting is terminated, as the selection signal of the signal selecting portion 210. Namely, the counter 216 of the counting portion 206, initialized in response to the reset signal input to the reset terminal (RESET), performs counting in response to the counting clock signal output from the clock signal generator 208 and input to the clock terminal (CK), holds the counted value in response to the counting termination signal shown in FIG. 9D and input to the hold terminal (H), and outputs the count result (A) shown in FIG. 9C to the comparator 218. The comparator 218 compares the result (A) counted by the counter 216 with the second predetermined number, and outputs the counting termination signal shown in FIG. 9D to the selection terminal (S) of the multiplexer 222 as the selection signal in response to the comparison result.

The multiplexer (MUX) 222 of the signal selecting portion 210 receives the EFM signal shown in FIG. 9A through a second input terminal I2, receives the inverted EFM signal output from the inverter 220 through a first input terminal I1, and selectively outputs one of the input signals through the output terminal OUT1 as the compensated EFM signal shown in FIG. 9E in response to the counting termination signal shown in FIG. 9D, i.e., the selection signal.

The clock signal generator 208 outputs the counting clock signal in a manner similar to the clock signal generator 68 shown in FIG. 3.

Figure 10:
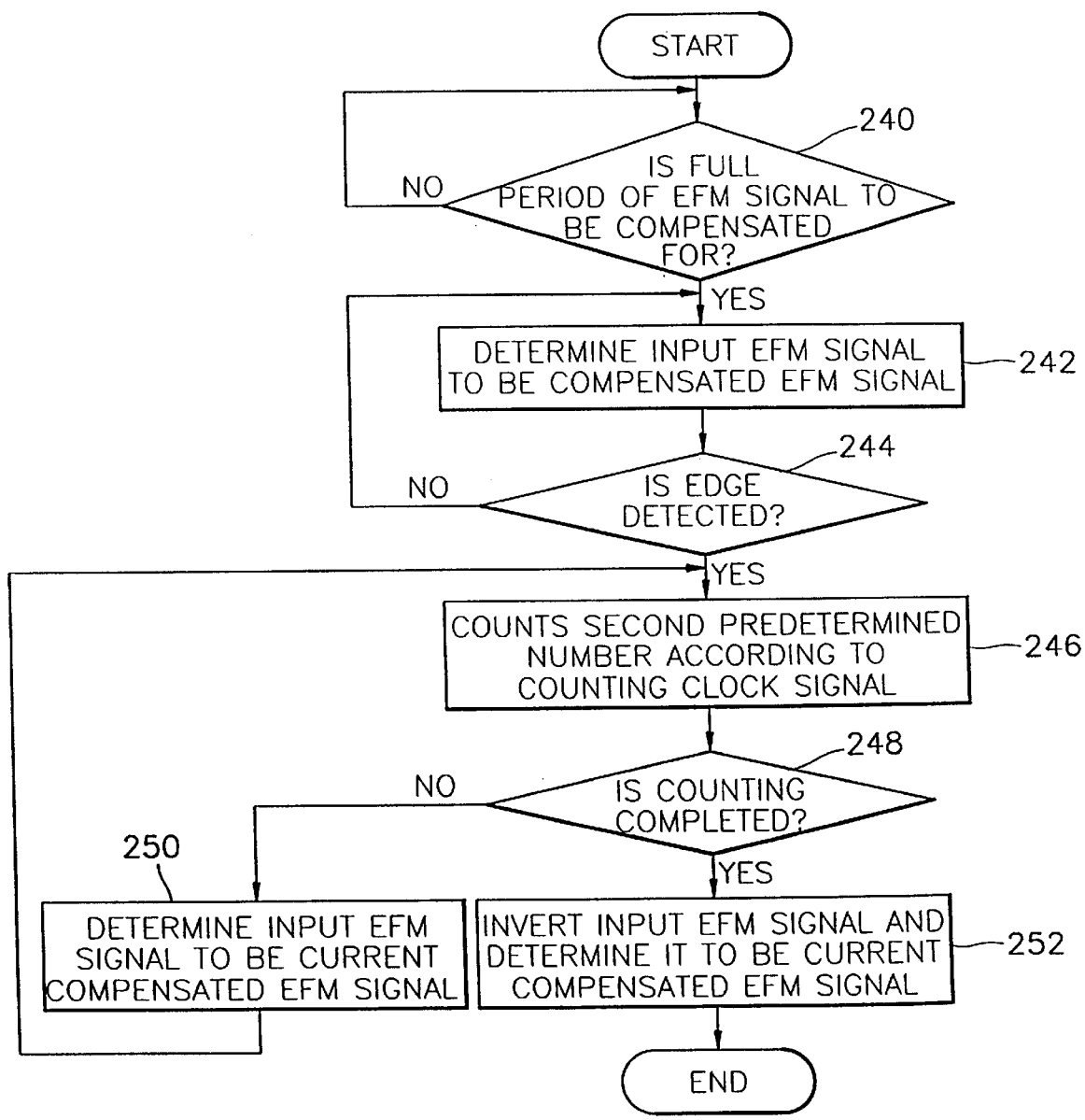
FIG. 10 is a flowchart describing a method for compensating for the full period according to the present invention, performed by the full period compensating portion shown in FIG. 8.

FIG. 10 is a flowchart describing the method for compensating for the full period according to the present invention, performed by the full period compensating portion 16C shown in FIG. 8. The method includes the steps of preparing to compensate for the full period (step 240), of performing counting or compensating for the full period, corresponding to the detected edge (steps 242 through 246), and of determining the compensated EFM signal, depending on whether the counting is completed (steps 248 through 252).

The full period compensating portion 16C shown in FIG. 8 first prepares to compensate for the full period of the EFM signal (the step 240). For this, it is determined whether the full period of the EFM signal will be compensated for (step 240). Namely, the reset signal generator 204 monitors the initial reset signal (RESET0), and when it is input, the currently input EFM signal shown in FIG. 9A is determined to be the compensated EFM signal (step 242). When the counter 216, initialized in response to the reset signal generated by the reset signal generator 204, outputs the initial value thereof to the comparator 218 as the counted value (A), the counting termination signal of a "low" logic level is generated by the comparator 218. Therefore, the multiplexer 222 selects the EFM signal input through the second input terminal I2 as the compensated EFM signal, in response to the counting termination signal of a "low" logic level, and outputs the selected signal. At this time, the counter 216 begins counting after being reset and outputs the counted value (A) to the comparator 218. The comparator 218 outputs the counting termination signal shown in FIG. 9D of a "high" logic level to the selection terminal (S) of the multiplexer 222, if the counted value (A) reaches the second predetermined number.

Following step 242, the reset signal generator 204 determines whether the rising or falling edge of the EFM signal is detected by the edge detector 202 (step 244). When the rising or falling edge is not detected, the comparator 218 allows the EFM signal input through the second input terminal I2 of the multiplexer 222 to be output as the compensated EFM signal, by continuously generating the counting termination signal of a "low" logic level (step 242). However, when the rising or falling edge is detected, the counting portion 206 counts the second predetermined number, corresponding to the counting clock signal (step 246). For example, when the input EFM signal has a full period 230 as shown in FIG. 9A in which an error 232 exists, the edge detector 202 detects the edge of the EFM signal and outputs the rising and falling edge signals shown in FIG. 9B to the OR gate 214. At this time, the OR gate 214 performs an OR operation on the edge signal of the "high" logic level and the initial reset signal (RESETO), and the OR operation result is output to the counter 216 as a reset signal at a "high" logic level. Accordingly, the counter 216 is initialized, begins counting, and outputs the counted value to the comparator 218.

Following step 246, it is determined by comparator 218, whether the counting of the counter 210 has completed (step 248). When counting has not yet completed, a selection signal of a "low" logic level is generated. Accordingly, the multiplexer 222 outputs the EFM signal shown in FIG. 9A as the current compensated EFM signal and the method proceeds to step 246 (step 250). However, when the counting has completed, namely, when the counted value is equal to the second predetermined number, the comparator 218 generates the counting termination signal 234 of a "high" logic level shown in FIG. 9D. Therefore, the multiplexer 222 selects the inverted EFM signal 236 input through the first input terminal I1 and outputs the selected signal through the output terminal OUT1 as the compensated EFM signal shown in FIG. 9E (step 252).

Figure 11:
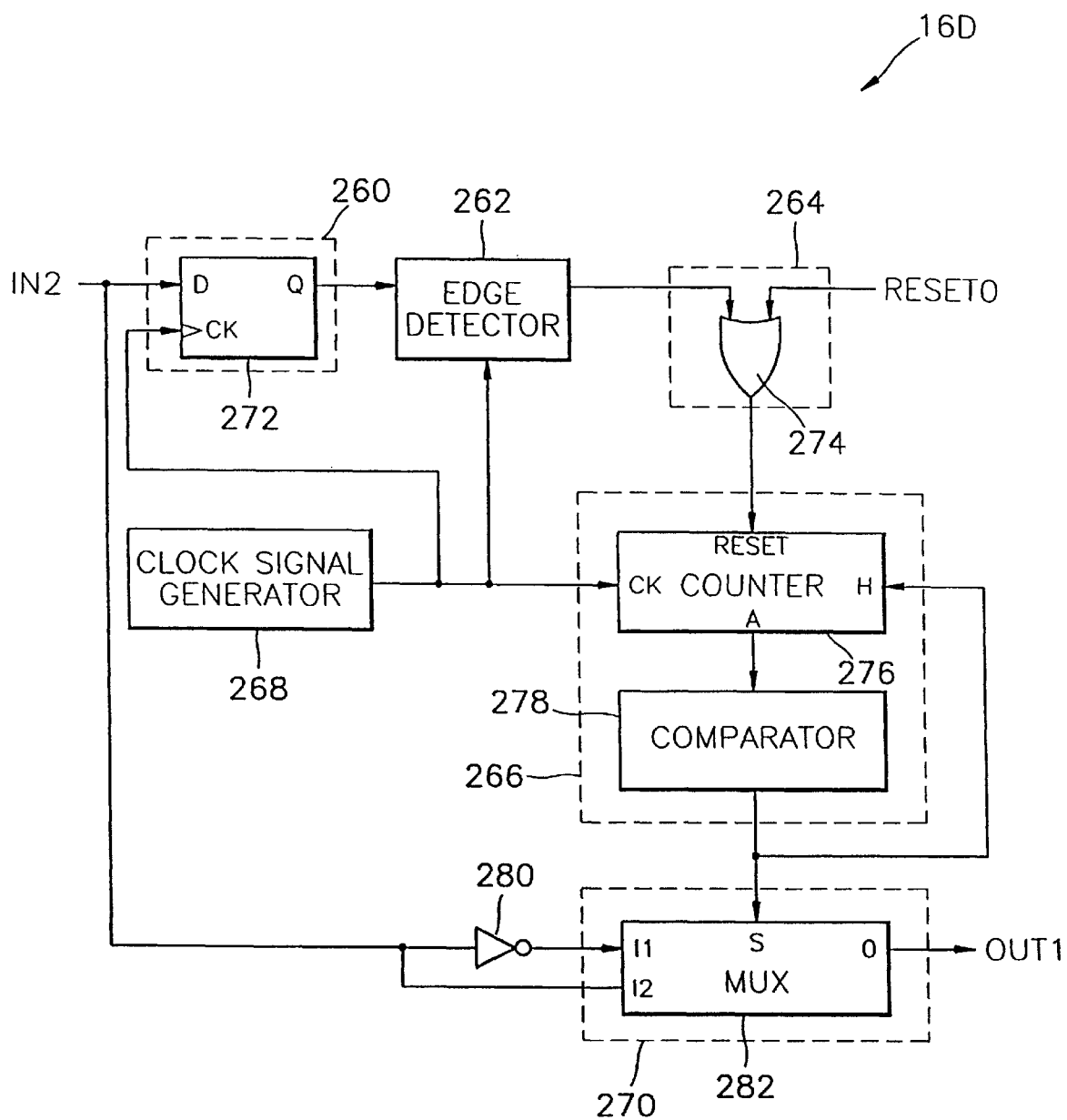
FIG. 11 is a circuit diagram of the full period compensating portion shown in FIG. 1, according to a fourth embodiment of the present invention.

FIG. 11 is a circuit diagram of the full period compensating portion 16 shown in FIG. 1, according to a fourth embodiment of the present invention. The full period compensating portion 16D is comprised of a D flip-flop 272 for realizing a noise removing portion 260, an edge detector 262, an OR gate 274 for realizing a reset signal generator 264, a counter 276 and a comparator 278 for realizing a counting portion 266, a clock signal generator 268, an inverter 280, and a multiplexer (MUX) 282 for realizing a signal selecting portion 270.

The full period compensating portion 16D shown in FIG. 11 has the same structure and performs the same function as the full period compensating portion 16C shown in FIG. 8, except that the edge detector 262 detects the edge of the EFM signal using the counting clock signal as shown in FIG. 6B. Therefore, the full period compensating portion 16C or 16D shown in FIG. 8 or 11 compensates for the error 232 of the full period shown in FIG. 9A and outputs the compensated EFM signal shown in FIG. 9E.

The above second predetermined number can be a predetermined value of not more than 11T/T" or a predetermined value of not more than 14T/T'", depending on the field of use. For example, if the second predetermined number is a predetermined value of not more than 11T/T", the full period compensating portion 16C or 16D shown in FIG. 8 or 11 can be used in a CD system in order to compensate the error of the EFM signal having a full period larger than 11T. Namely, if the full period T' of the EFM signal input through the input terminal IN2 is 15T, the full period compensating portion compensates the full period T' of the input EFM signal to 11T. When the second predetermined number is a predetermined value of not more than 14T/T'", the full period compensating portion 16C or 16D shown in FIG. 8 or 11 can be used in a DVD system in order to compensate for the error of the EFM signal having the full period larger than 14T.

For example, when one period T" of the counting clock signal is 29.5 ns and the above full period compensating portion 16C or 16D is used in a CDP system, the second predetermined number can be set as a predetermined value of not more than 89.

On the other hand, when an EFM signal having a full period of not less than 11T or 14T is continuously input to the full period compensating portion 16C or 16D shown in FIG. 8 or 11, the full period compensation can be erroneously performed. The full period compensating portion can be structured to solve this, as follows.

Figure 12:
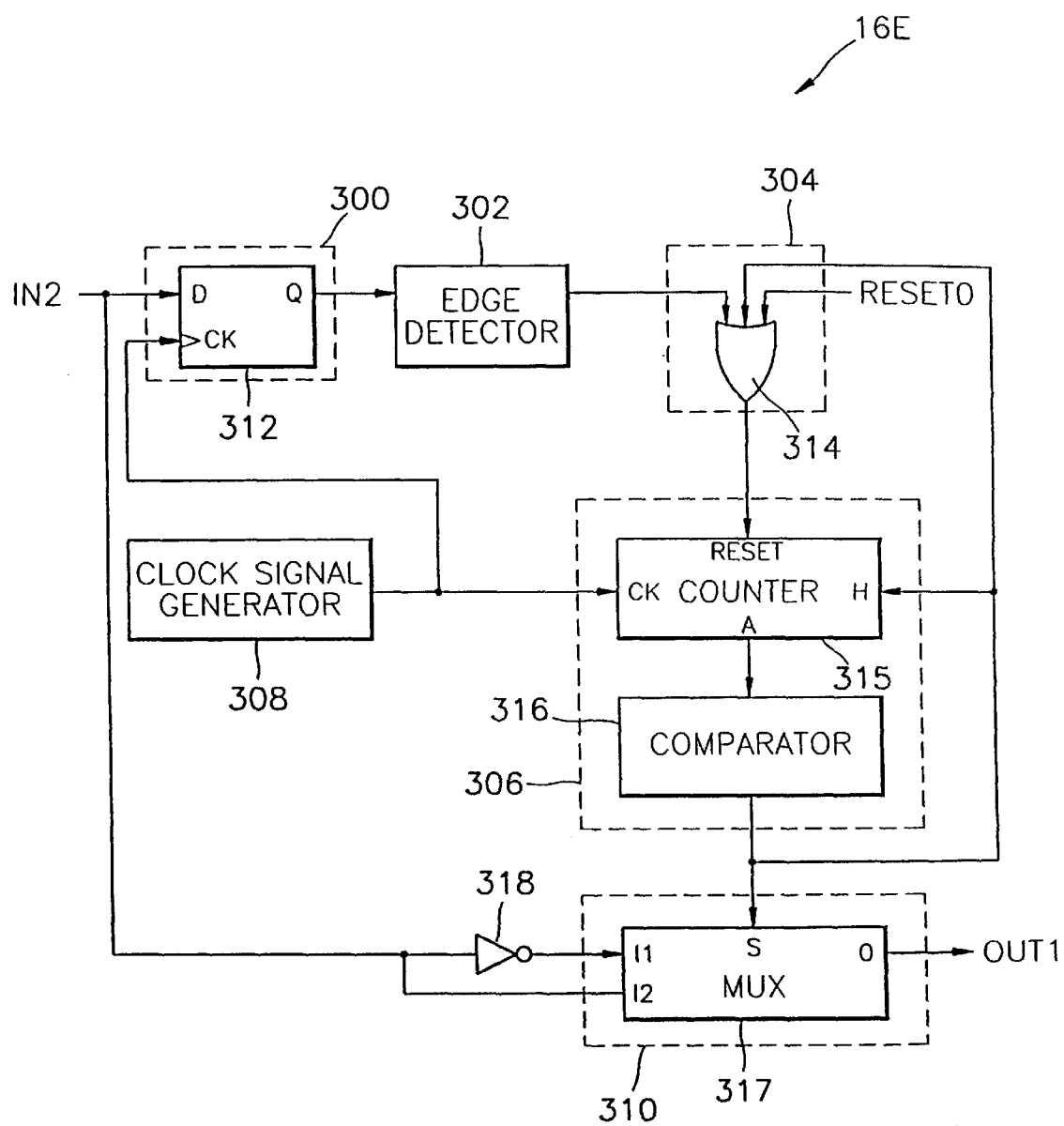
FIG. 12 is a circuit diagram of the full period compensating portion shown in FIG. 1, according to a fifth embodiment of the present invention.

FIG. 12 is a circuit diagram of the full period compensating portion 16 shown in FIG. 1, according to a fifth preferred embodiment of the present invention. The full period compensating portion 16E is comprised of a D flip-flop 312 for realizing a noise removing portion 300, an edge detector 302, an OR gate 314 for realizing a reset signal generator 304, a counter 315 and a comparator 316 for realizing a counting portion 306, a clock signal generator 308, an inverter 318, and a multiplexer (MUX) 317 for realizing a signal selecting portion 310.

Figures 13A, 13B, 13C, 13D, 13E, 13F, 13G, 13H:
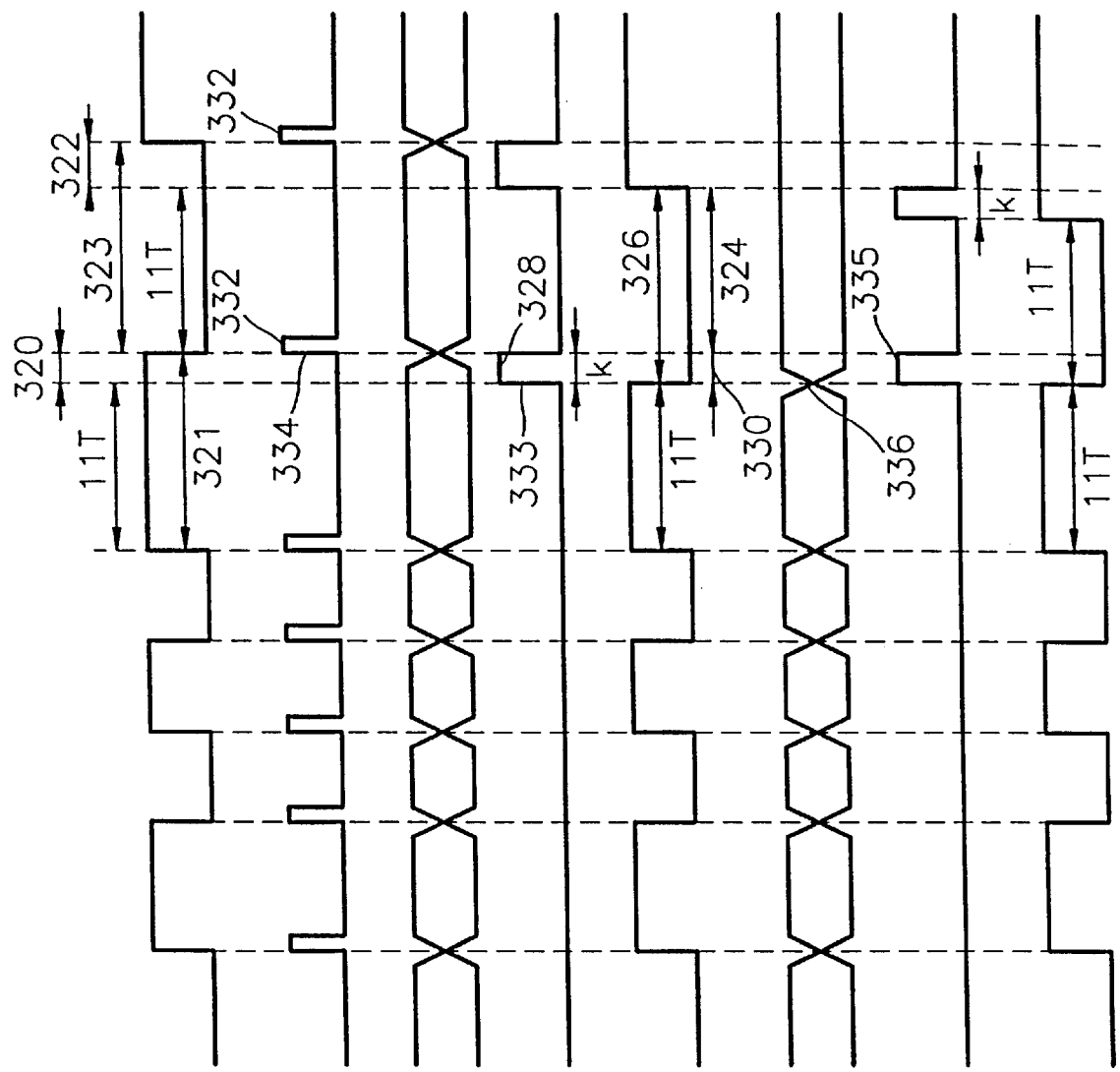
FIGS. 13A through 13H are waveforms at various nodes of the full period compensating portions shown in FIGS. 8 and 12.

FIGS. 13A through 13H show waveforms of the portions of the full period compensating portions 16C and 16E shown in FIGS. 8 and 12. FIG. 13A shows the waveform of the EFM signal. FIG. 13B shows the waveforms of the rising edge and falling edge signals. FIGS. 13C and 13F respectively show the waveforms of the counted values (A) output from the counters 216 and 315. FIGS. 13D and 13G respectively show the waveforms of the counting termination signals output from the comparator 218 and 316. FIGS. 13E and 13H respectively show the waveforms of the compensated EFM signals output from the signal selecting portions 210 and 310.

The portions of the full period compensating portion 16E shown in FIG. 12 perform the same operations as the respective portions of the full period compensating portion 16C shown in FIG. 8. Unlike the reset signal generator 204 shown in FIG. 8, however, the reset signal generator 304 shown in FIG. 12 performs an OR operation on the initial reset signal (RESETO), the edge signals shown in FIG. 13B detected by the edge detector 302, and the counting termination signal shown in FIG. 13G output from the comparator 316, and outputs the OR operation result to the reset terminal (RESET) of the counter 315 as the reset signal.

Figure 14:
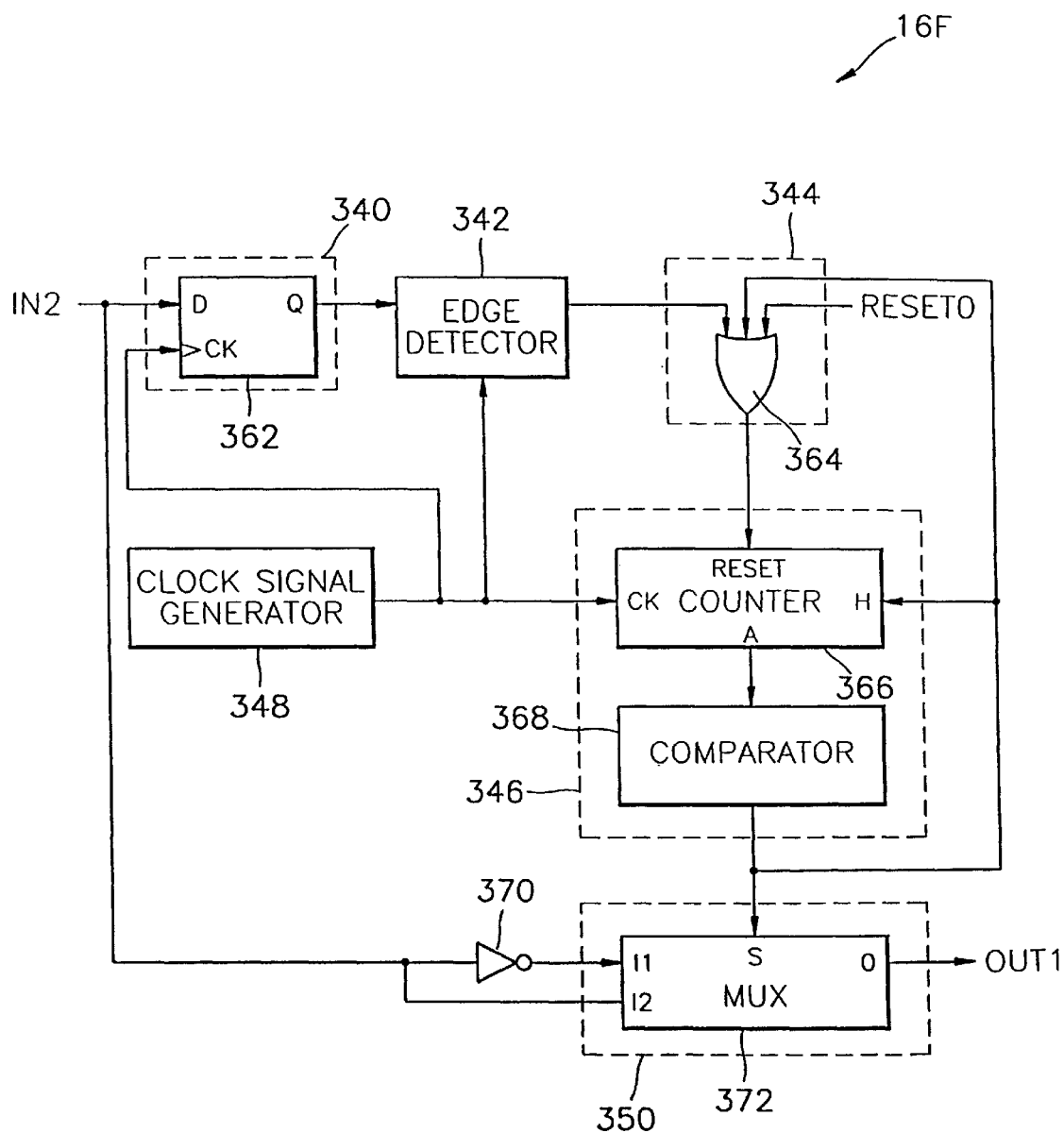
FIG. 14 is a circuit diagram of the full period compensating portion shown in FIG. 1, according to a sixth embodiment of the present invention.

FIG. 14 is a circuit diagram of the full period compensating portion 16 shown in FIG. 1, according to a sixth embodiment of the present invention. The full period compensating portion 16F is comprised of a D flip-flop 362 for realizing a noise removing portion 340, an edge detector 342, an OR gate 364 for realizing a reset signal generator 344, a counter 366 and a comparator 368 for realizing a counting portion 346, a clock signal generator 348, an inverter 370, and a multiplexer (MUX) 372 for realizing a signal selecting portion 350.

The full period compensating portion 16F shown in FIG. 14 has the same structure and performs the same function as the full period compensating portion 16E shown in FIG. 12, except that the edge detector 342 detects the edge of the EFM signal using the counting clock signal as shown in FIG. 6B.

When EFM signals having full periods 321 and 323 of not less than 11T, as shown in FIG. 13A, are continuously input through the input terminal IN2 shown in FIG. 8, the error 320 of the first full period 321 can be compensated for as shown in FIG. 13E. However, the error 322 of the second full period 323 is not compensated for, as shown in FIG. 13E. Namely, the value obtained by compensating for the second full period 323 is a value 326 of not less than 11T. This is because the counter 216 holds the counted value according to the counting termination signal 328 of a "high" logic level, shown in FIG. 13D, until the edge signal 332 of the "high" logic level shown in FIG. 13B is detected after the error 320 of the first full period 321 is compensated for and the counter 216 counts the second predetermined number when the edge signal 332 of a "high" logic level is detected. Therefore, the compensated EFM signal shown in FIG. 13E with respect to the second full period 323 shown in FIG. 13A comes to have an error section 330 (of width k) from the point of time 333 at which the counting termination signal of the "high" logic level shown in FIG. 13D is generated to a point of time 334 at which the reset signal 332 is generated.

In order to solve the above problem, when a counting termination signal 335 at a "high" logic level shown in FIG. 13G is generated by the comparator 316 or 368 shown in FIG. 12 or 14, a reset signal of a "high" logic level is immediately generated. Accordingly, the counting termination signal 335 is applied to the reset signal generator 304 or 344 so that the counting can be started at point 336. Therefore, as shown in FIG. 13H, the compensated EFM signal changes from a "low" logic level to a "high" logic level early by as much as the K section (k), in order to compensate for the error section (k). Therefore, the full period compensating portion 16E or 16F can correctly compensate for the error in the first and second full periods 321 and 323. Such a situation can be shown in the EFM signal when the EFM signal is used to detect a synchronization signal.

Each of the aforementioned embodiments 16A through 16F of the full period compensating portion 16, can be used for compensating for one full period, and when one full period is compensated for, can additionally compensate for the next fuill period. Namely, the above-mentioned full period compensating portions 16A through 16F can be used for compensating for each fuill period of the nine full periods 3T through 11T in a CD system and each full period of ten full periods 3T through 11T and 14T in a DVD system.

The structures and operations of the full period compensating portions for compensating for at least two full periods, and methods for compensating for the full periods, will be described as follows with reference to the attached drawings.

Figure 15:
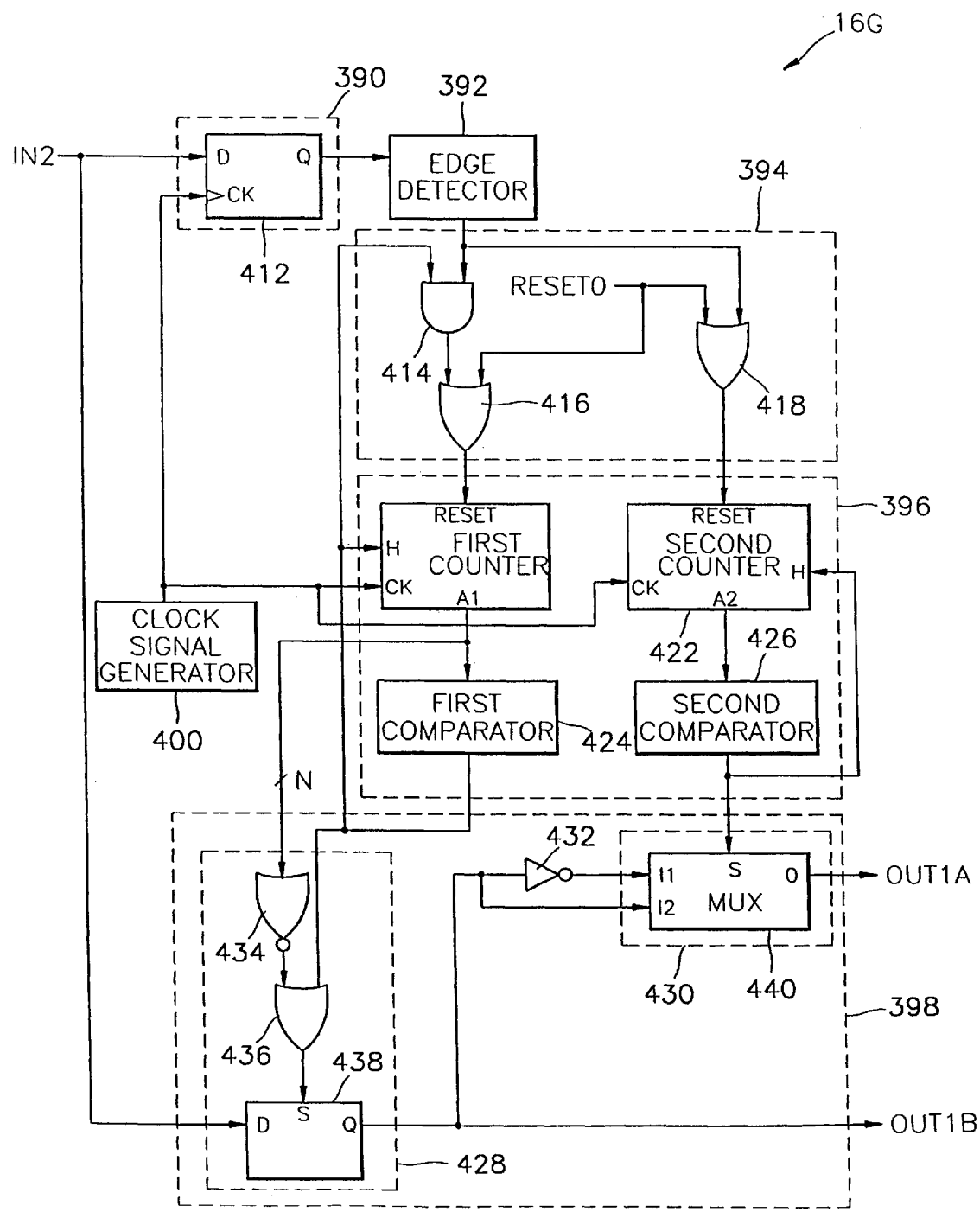
FIG. 15 is a circuit diagram of the full period compensating portion shown in FIG. 1, according to a seventh embodiment of the present invention.

FIG. 15 is a circuit diagram of the full period compensating portion 16 shown in FIG. 1, according to a seventh embodiment of the present invention. The full period compensating portion 16G is comprised of a D flip-flop 412 for realizing a noise removing portion 390, an edge detector 392, an AND gate 414 and OR gates 416 and 418 for realizing a reset signal generator 394, first and second counters 420 and 422 and first and second comparators 424 and 426 for realizing a counting portion 396, and a latching portion 428, an inverter 432, and a signal selecting portion 430 for realizing a compensated EFM signal generator 398. Here, the latching portion 428 is comprised of a NOR gate 434, an OR gate 436, and a latch 438. The signal selecting portion 430 is realized by a multiplexer 440.

The noise removing portion 390 shown in FIG. 15 removes noise from the edge of the EFM signal as described above. The noise-free signal is provided to the edge detector 392, which detects the rising or falling edge of the EFM signal input from the noise removing portion 390, and outputs the rising and falling edge signals to the reset signal generator 394 as described above.

The reset signal generator 394 outputs the first and second reset signals in response to the rising and falling edge signals and the counting termination signal, or the initial reset signal (RESETO). For this, the AND gate 414 performs an AND operation on the rising and falling edge signals output from the edge detector 392 and the first counting termination signal output from the first comparator 424. The first OR gate 416 performs an OR operation on the AND operation result output by the AND gate 414 and the initial reset signal (RESETO), and outputs the OR operation result as the first reset signal for resetting the first counter 420. The second OR gate 418 performs an OR operation on the rising and falling edge signals and the initial reset signal (RESETO), and outputs the OR operation result to the second counter 422 as the second reset signal for resetting the second counter 422.

The counting portion 396 is initialized in response to the first and second reset signals, counts the first and second predetermined numbers in response to the counting clock signal, and outputs the first and second counting termination signals. Namely, the first counter 420 is reset in response to the first reset signal, performs counting in response to the counting clock signal output from the clock signal generator 400, holds the counted result A1 in response to the first counting termination signal, and outputs the counted value A1 to the first comparator 424. The second counter 422 is reset in response to the second reset signal, performs counting in response to the counting clock signal output from the clock signal generator 400, holds the counted result A2 in response to the second counting termination signal, and outputs the counted value to the second comparator 426.

The clock signal generator 400 generates the counting clock signal as described above.

The compensated EFM signal generating portion 398 outputs to output terminals OUT1A and OUT1B the current compensated EFM signals obtained in response to the first and second counting termination signals or the first counted value A1 counted by the first counter 420 and using the EFM signal and the previous compensated EFM signal, which was previously latched in the latch 438.

For this, the latching portion 428 of the compensated EFM signal generating portion 398 outputs the EFM signal or the previous compensated EFM signal output through the output terminal OUT1B, as the current compensated EFM signal through the output terminal OUT1B, in response to the first counting termination signal or the first counted value Al. Namely, the NOR gate 434 performs a NOR operation on the N bit output of the first counter 420 and outputs the result. The OR gate 436 performs an OR operation on the output of the NOR gate 434 and the first counting termination signal, and outputs the OR operation result to the latch 438 as the selection signal. The latch 438 outputs the EFM signal input through the input terminal IN2 or the previous compensated EFM signal, which was previously output through the output terminal OUT1B, through the output terminal OUT1B in response to the selection signal input to the selection terminal S.

The multiplexer 440 of the signal selecting portion 430 selectively outputs either the EFM signal output from the latch 438 and input to the second input terminal I2, or the EFM signal inverted by the inverter 432 and input to the first input terminal I1, through the output terminal OUT1A, as the compensated EFM signal, in response to the second counting termination signal.

Figure 16:
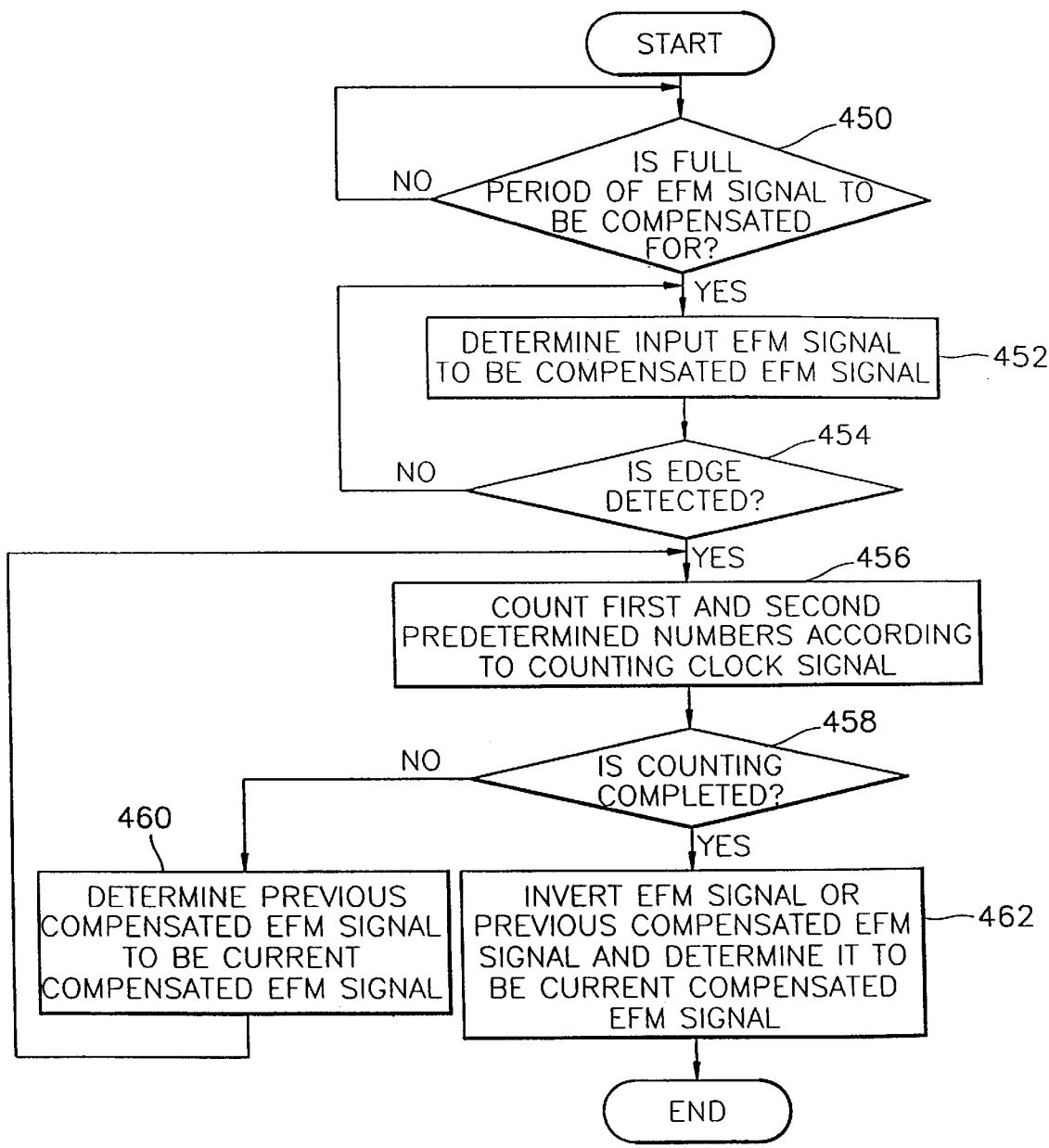
FIG. 16 is a flowchart describing a method for compensating for the full period according to the present invention, performed by the full period compensating portion shown in FIG. 15.

FIG. 16 is a flowchart describing the method for compensating for the full period according to the present invention, performed by the full period compensating portion 16G shown in FIG. 15. The method includes the steps of preparing to compensate for the full period (step 450), performing the counting or compensating for the full period, corresponding to the detected edge (steps 452 through 456), and of determining the compensated EFM signal, corresponding to whether the counting is completed (steps 458 through 462).

The full period compensating portion 1 6G shown in FIG. 15 prepares to compensate for the full period of the EFM signal (step 450). For this, it is continuously determined whether the full period of the EFM signal will be compensated for (step 450). Namely, the reset signal generator 394 continuously determines whether the initial reset signal (RESETO) is input.

When the initial reset signal (RESETO) for compensating for the full period of the EFM signal is input, the EFM signal currently input through the input terminal IN2 is determined to be the compensated EFM signal (step 452). Namely, since the first counter 420, initialized in response to the first reset signal generated by the OR gate 416 of the reset signal generator 394, outputs the initial value thereof to the NOR gate 434 as the counted value A1, the latch 438 outputs the EFM signal, input through the input terminal IN2, through the output terminal OUT1B as the compensated EFM signal (step 452). At this time, the first counter 420 starts counting after being reset in response to the first reset signal and outputs the counted value to the first comparator 424. The first comparator 424 outputs the first counting termination signal to the AND gate 414, the hold terminal (H) of the first counter 420, and the OR gate 436, when the counted value A1 reaches the first predetermined number.

When the second counter 422, initialized in response to the second reset signal generated by the reset signal generator 394, outputs the initial value thereof to the second comparator 426 as the counted value A2, the second counting termination signal of a "low" logic level is generated by the second comparator 426, as described below. Therefore, the multiplexer 440 selects the output of the latch 438 as the compensated EFM signal in response to the second counting termination signal of a "low" logic level, and outputs it through the output terminal OUT1A (step 452). At this time, the second counter 422 starts counting after being reset and outputs the counted value to the second comparator 426. The second comparator 426 outputs the second counting termination signal of a "high" logic level as the selection signal of the multiplexer 440, when the counted value reaches the second predetermined number.

Following step 452, the edge detector 392 determines whether the rising or falling edge of the EFM signal is detected (step 454). When the rising or falling edge is not detected, the method returns to step 452.

When the rising or falling edge is detected, the counting portion 396 counts the first and second predetermined numbers, according to the counting clock signal (step 456). Namely, the first and second counters 420 and 422 start counting after being reset in response to the first and second reset signals, and output the counted values to the first and second comparators 424 and 426. The first and second comparators 424 and 426 respectively compare the counted values A1 and A2 with the first and second predetermined values.

Following step 456, it is determined whether, in each of the comparators 424 and 426, counting has completed (step 458). When the counting has not completed in either of the first and second counters 420 and 422, the previous compensated EFM signal which was previously output from the latch 438 is output through the output terminals OUT1A and OUT1B (the step 460). Namely, the first counter 420 continuously performs the counting, thus generating the selection signal of a "low" logic level. The latch 438 outputs the compensated EFM signal which was previously output through the output terminal OUT1A and the method returns to step 456. Also, since the second counter 422 continuously performs the counting, a selection signal of a "low" logic level is generated. The multiplexer 440 outputs the EFM signal, output from the latch 438, through the output terminal OUT1B as the current compensated EFM signal, and the method returns to step 456. However, when counting is completed by the first and second counters 420 and 422, the EFM signal or the inverted EFM signal obtained by inverting the EFM signal output from the latch 438 is determined to be the current compensated EFM signal (step 462). Namely, when the value A1 counted in the first counter 420 reaches the first predetermined value, the first comparator 424 generates the first counting termination signal of a "high" logic level. Therefore, the EFM signal input through the input terminal IN2 is output from the latch 438 and via the output terminal OUT1B. Furthermore, when the value counted by the second counter 422 reaches the second predetermined value, the second comparator 426 generates the second counting termination signal of a "high" logic level. Therefore, the multiplexer 440 selects the inverted EFM signal output from the inverter 432 and outputs the selected signal through the output terminal OUT1A as the compensated EFM signal.

Therefore, the apparatus 16G shown in FIG. 15 can compensate for two full periods. The first and second predetermined numbers described in FIG. 15 have the same meaning as the first and second predetermined numbers mentioned in FIG. 3 or 8.

Figure 17:
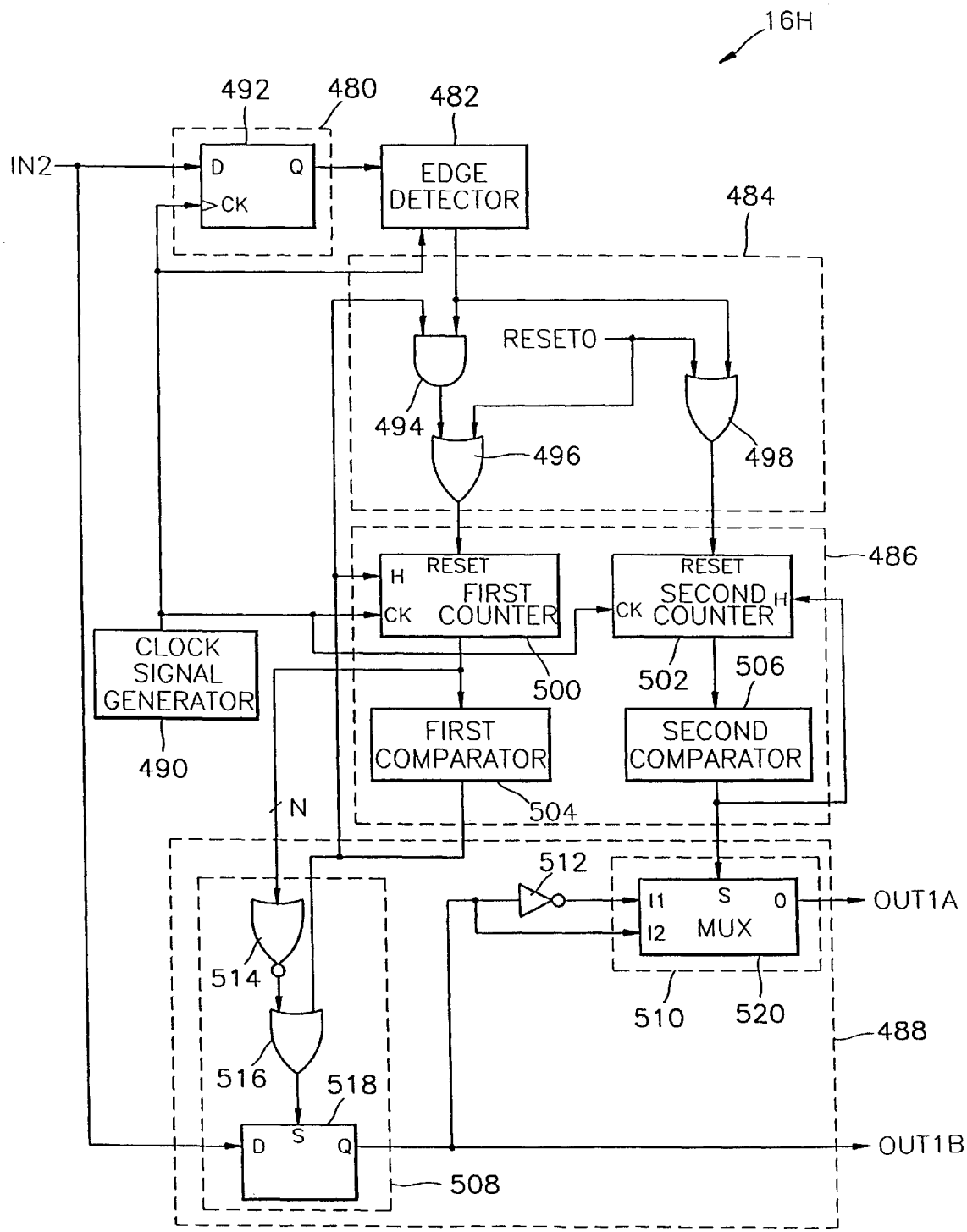
FIG. 17 is a circuit diagram of the full period compensating portion shown in FIG. 1, according to an eighth embodiment of the present invention.

FIG. 17 is a circuit diagram of the full period compensating portion 16 shown in FIG. 1, according to an eighth embodiment of the present invention. The full period compensating portion 16H is comprised of a D flip-flop 492 for realizing a noise removing portion 480, an edge detector 482, an AND gate 494 and OR gates 496 and 498 for realizing a reset signal generator 484, first and second counters 500 and 502 and first and second comparators 504 and 506 for realizing a counting portion 486, and a latching portion 508, an inverter 512, and a signal selecting portion 510 for realizing a compensated EFM signal generating portion 488. Here, the latching portion 508 is comprised of a NOR gate 514, an OR gate 516, and a latch 518. The signal selecting portion 510 is realized by a multiplexer 520.

The full period compensating portion 16H shown in FIG. 17 has the same structure and performs the same function as the full period compensating portion 16G shown in FIG. 15, except that the edge detector 482 detects the edge of the EFM signal using the counting clock signal as shown in FIG. 6B.

Figure 18:
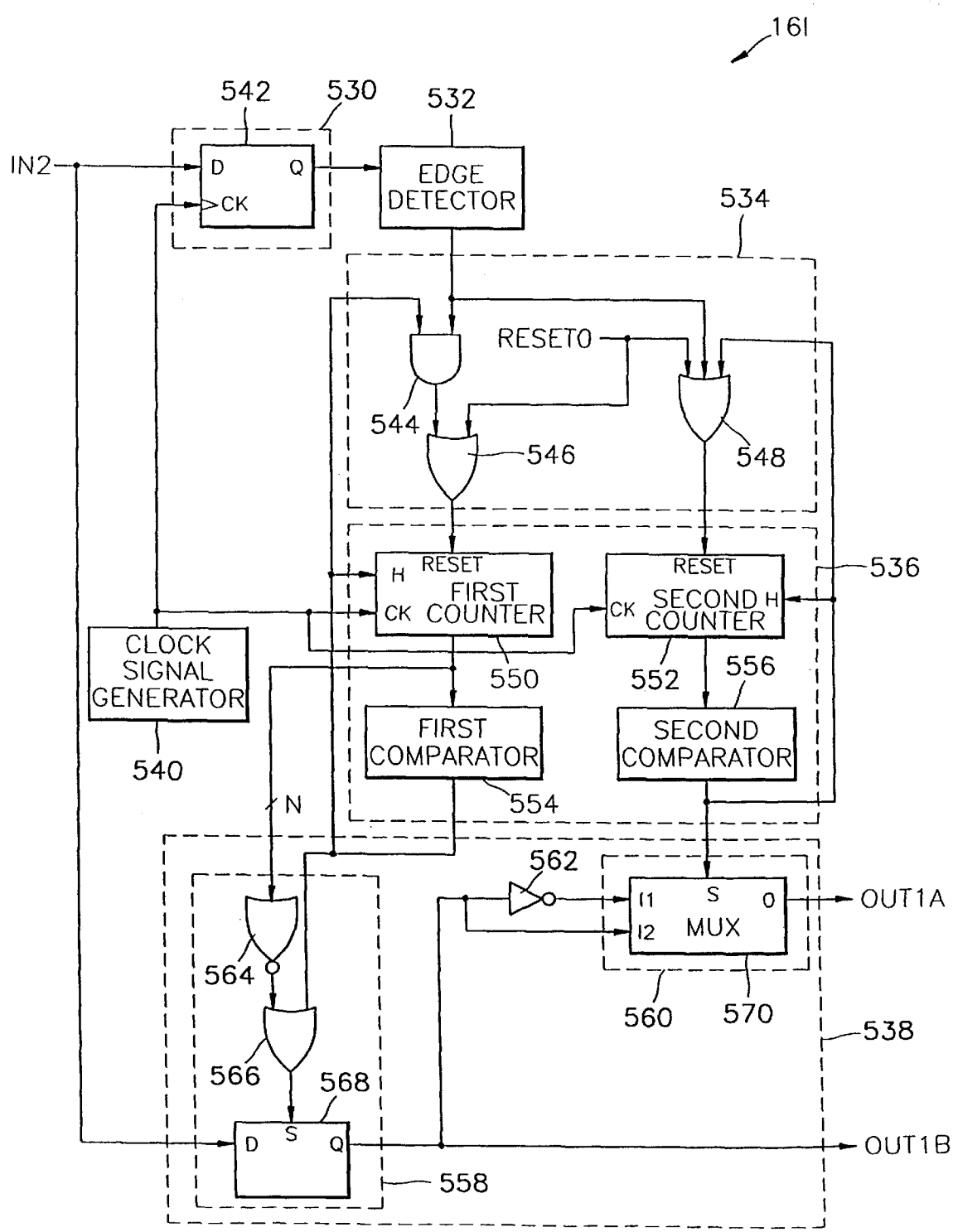
FIG. 18 is a circuit diagram of the full period compensating portion shown in FIG. 1, according to a ninth embodiment of the present invention.

FIG. 18 is a circuit diagram of the full period compensating portion 16 shown in FIG. 1, according to a ninth embodiment of the present invention. The full period compensating portion 16I is comprised of a D flip-flop 542 for realizing a noise removing portion 530, an edge detector 532, an AND gate 544 and OR gates 546 and 548 for realizing the reset signal generator 534, first and second counters 550 and 552 and first and second comparators 554 and 556 for realizing a counting portion 536, a latching portion 558, an inverter 562 and a signal selecting portion 560 for realizing a compensated EFM signal generating portion 538. Here, the latching portion 558 is comprised of a NOR gate 564, an OR gate 566, and a latch 568. The signal selecting portion 560 is realized by a multiplexer 570.

The full period compensating portion 16I shown in FIG. 18 performs the same function as the full period compensating portion 16G shown in FIG. 15, except for two points. First, the OR gate 548 of the reset signal generator 534 performs an OR operation on the rising and falling edge signals, the initial reset signal (RESET0), and the second counting termination signal, and outputs the OR operation result as the second reset signal. Second, the second counter 552 can be reset in response to the second counting termination signal, for reasons described above in conjunction with the full period compensating portion 16E shown in FIG. 12.

Figure 19:
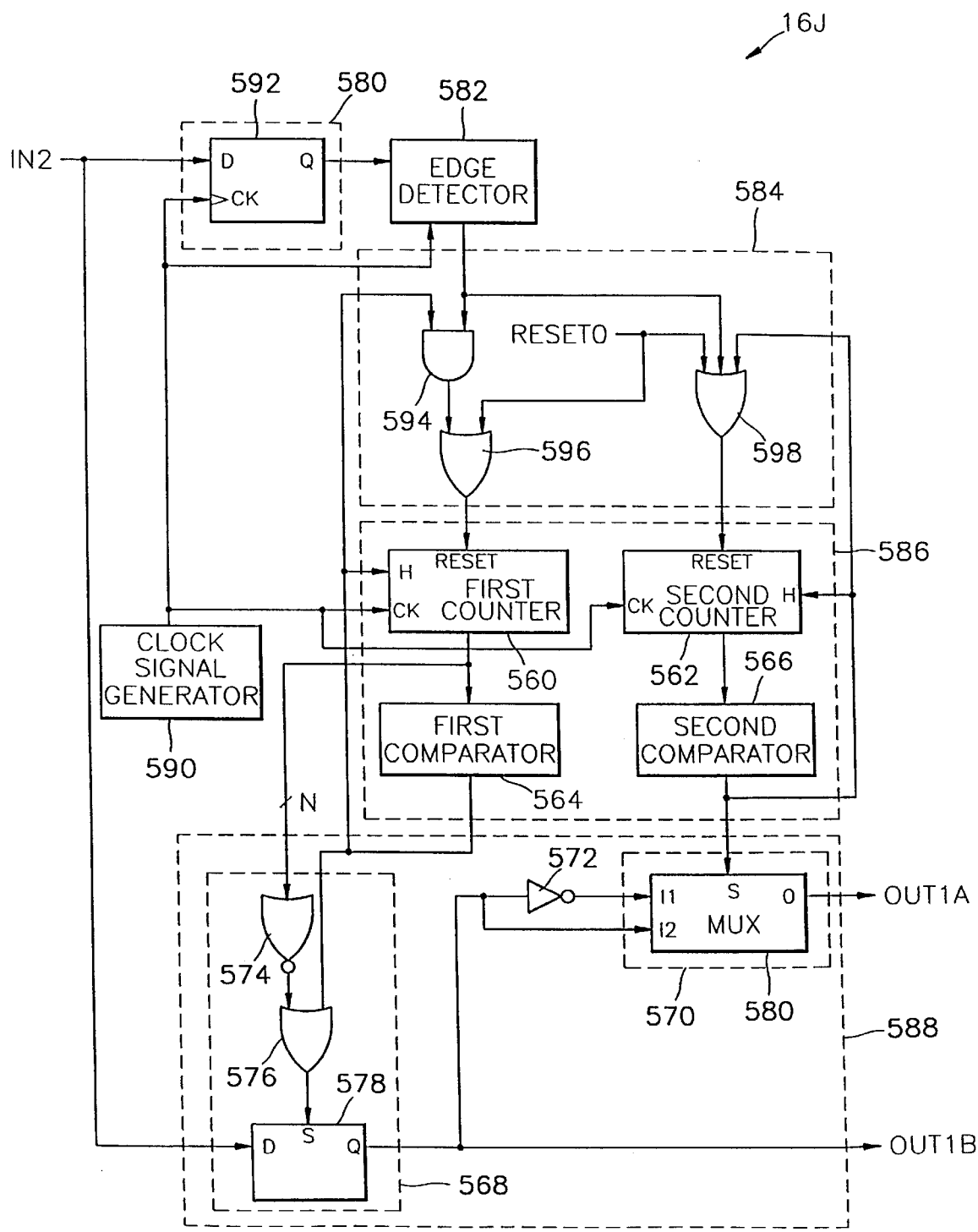
FIG. 19 is a circuit diagram of the full period compensating portion shown in FIG. 1, according to a tenth embodiment of the present invention.

FIG. 19 is a circuit diagram of the full period compensating portion 16 shown in FIG. 1, according to a tenth embodiment of the present invention. The full period compensating portion 16J is comprised of a D flip-flop 592 for realizing a noise removing portion 580, an edge detector 582, an AND gate 594 and OR gates 596 and 598 for realizing a reset signal generator 584, first and second counters 560 and 562 and first and second comparators 564 and 566 for realizing a counting portion 586, a latching portion 568, an inverter 572, and a signal selecting portion 570 for realizing a compensated EFM signal generating portion 588. Here, the latching portion 568 is comprised of a NOR gate 574, an OR gate 576, and a latch 578. The signal selecting portion 570 is realized by a multiplexer 580.

The full period compensating portion 16J shown in FIG. 19 has the same structure and performs the same function as the full period compensating portion 16I shown in FIG. 18, except that the edge detector 582 of FIG. 19 detects the edge of the EFM signal using the counting clock signal as shown in FIG. 6B.

The full period compensating portions 16G, 16H, 16I and 16J compensate for two full periods. However, it is possible to realize a circuit for compensating for a plurality of full periods, by cascading the full period compensating portion 16A or 16C shown in FIG. 3 or 8 to that of FIGS. 15, 17, 18, or 19, in parallel or in series.

The counters used in the embodiments of the above-mentioned full period compensating portion 16 can perform, for example, a 4–30 bit counting operation, corresponding to the period T of the reference frequency clock signal.

Also, the respective edge detectors may be double edge detectors which can detect both rising and falling edges, or single edge detectors which detect only one among the rising and falling edges.

Furthermore, in the respective embodiments, a preferred embodiment of the clock signal generator divides or multiplies the frequency of the reference frequency clock signal, output from a voltage-controlled oscillator (not shown) of a digital phase locked loop (not shown), by a predetermined number and outputs the reference frequency clock signal having the divided or multiplied frequency as the counting clock signal. Alternatively, the clock signal generator multiplies or divides the frequency of a system clock signal, output from a crystal oscillator (not shown) and having a frequency of 16 MHz or 34 MHz, by a predetermined number and outputs a system clock signal having the multiplied or divided frequency as the counting clock signal. Here, since the input frequency increases according to multiple speeds in the DVD system or the CD system, the counting clock signal having a predetermined multiple frequency, for example, two or three times higher than the full frequency (1/the full period) of the EFM signal, must be used. This can be properly selected according to resolution. Here, the frequency of the reference frequency clock signal is 1.44 MHz in the case of the CDP, and varies according to the multiple speeds in the case of the DVD system.

In the above embodiments of the full period compensating portion 16, the error of the full period can be removed when the error of the full period of the EFM signal is more than −0.5T and less than 0T. Namely, when the full period of the EFM signal is, for example, 5.55T–5.99T, the full period can be compensated to 6T. However, when the error of the full period is less than +0.5T and more than 0T, the error of the full period cannot be corrected by the above embodiments. Namely, when the full period of the EFM signal output from the signal converter 12 or the first DPLL 14, shown in FIG. 1, is, for example, 3.05T–3.45T, the full period cannot be compensated to 3T by the above embodiments of the present invention. In order to solve that, the structure and operation of the full period compensating device according to the present invention will be described as follows with reference to the attached drawings.

Figure 20:
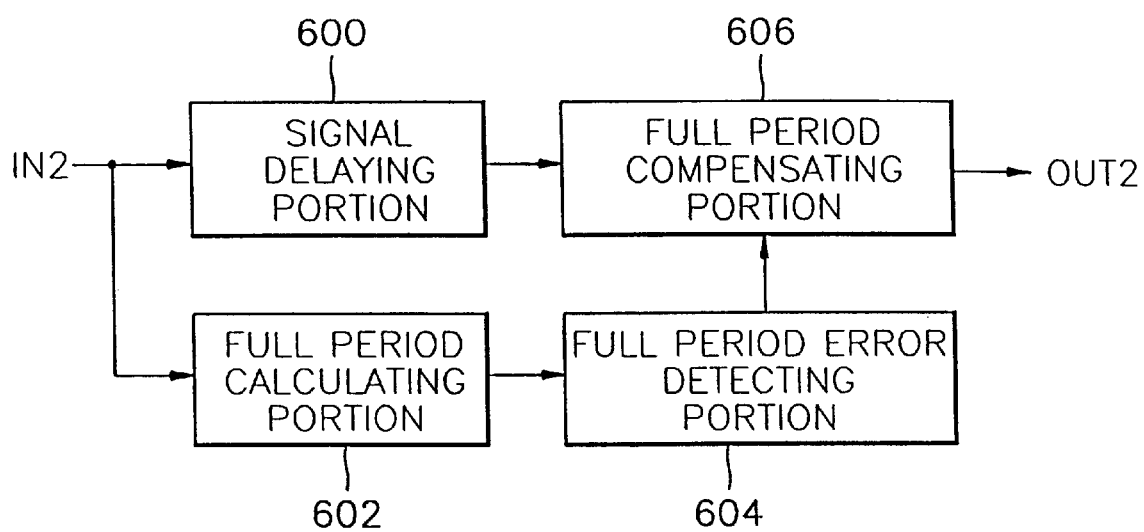
FIG. 20 is a block diagram of the full period compensating apparatus according to the present invention.

FIG. 20 is a block diagram of the full period compensating device according to the present invention. The device is comprised of a signal delaying portion 600, a full period calculating portion 602, a full period compensating portion 606, and a full period error detecting portion 604.

The signal delaying portion 600 shown in FIG. 20 receives via input terminal IN2, an EFM signal output from the signal converter 12 or the first DPLL 14, shown in FIG. 1 and outputs it to the full period compensating portion 606 after delaying the input signal for a predetermined time, for example, 1T. The full period calculating portion 602 calculates the full period of the EFM signal output from the signal convertor 12 or the first DPLL 14 and outputs the calculated full period. For this, the full period calculating portion 602 can be realized as a counter for counting how many periods T exist in the full period of the EFM signal. The full period error detecting portion 604 detects the error, which corresponds to one among 0.05T~0.45T, of the value calculated by the full period calculating portion 602 and outputs the detected error to the full period compensating portion 606. For this, the full period error detecting portion 604 can be realized as a comparator.

The full period compensating portion 606 shown in FIG. 20 corrects errors in the full period of the EFM signal output from the signal delaying portion 600, corresponding to the error detected by the full period error detecting portion 604, and outputs the compensated EFM signal, in which the error is compensated for, through the output terminal OUT2.

For example, assuming that the full period of the EFM signal input through the input terminal IN2 is 6.4T, the output of the signal delaying portion 600 becomes 5.4T, the output of the full period calculating portion 602 becomes 6.4T and the output of the full period error detecting portion 604 becomes 0.4T. Then, since the detected error 0.4T output from the full period error detecting portion 604 is more than 0 T and less than 0.5T, the full period compensating portion 606 corrects the full period 6.4T into 6T and outputs the EFM signal having the corrected full period 6T, through output terminal OUT2. Here, the signal delaying portion 600 delays the EFM signal having the full period 6.4T by 1T and outputs the delayed EFM signal having the full period 5.4T, to the full period compensating portion 606.

The above embodiments of the full period compensating portion 16, and the methods for operating the full period compensating portion, are restricted to the case in which the error of the full period is ±0.5T. However, when the error of the full period is 0.5T, the error of the full period can be compensated for by adding ±0.5T to the full period having the error. Namely, the full period of 4.5T can be compensated to 4T or 5T.

As mentioned above, in the optical disk reading apparatus having the full period compensating function according to the present invention, and the method for operating the same, picture quality is improved by compensating for errors in the full periods of the EFM signal generated by poor manufacture or faults caused during use. The invention is flexible with respect to the performance and the chip size, since errors can be compensated with respect to a specific value of T. It is possible to increase resolution by controlling the frequency of the counting clock signal. It is further possible to effectively compensate for full period errors in a system having small full periods, such as the DVD system.

While this invention has been particularly shown and described with references to preferred embodiments thereof, it will be understood by those skilled in the art that various changes in form and details may be made therein without departing from the spirit and scope of the invention as defined by the appended claims.

We claim:

1. An optical disk reading apparatus adapted for full period error compensation, comprising:
    an RF amplifying means for converting an optical signal reflected from an optical disk into an analog electrical signal;
    a signal converting means for converting the analog electrical signal into a digital signal and for outputting the converted digital signal as a modulated signal;
    a full period compensating means for compensating for full period error in the modulated signal by counting the duration of the error and compensating for the error based on the duration, and for outputting the error compensated modulated signal as a compensated modulated signal.

2. The optical disk reading apparatus of claim 1, wherein the full period compensating means comprises:
    an edge detecting means for detecting the edge of the modulated signal and for outputting an edge signal;
    a reset signal generating means for outputting a reset signal in response to the edge signal and a counting termination signal, or an initial reset signal;
    a counting means initialized in response to the reset signal, for counting a first predetermined number in response to a counting clock signal and for outputting the counting termination signal indicating the termination of counting;
    a clock signal generating means for generating the counting clock signal; and
    a latching means for outputting the modulated signal as a current compensated signal in response to a counting termination signal, or for outputting a previous compensated modulated signal previously output from the full period compensating means as a current compensated signal in response to a value counted by the counting means.

3. The apparatus of claim 2, wherein the counting means comprises:
    a counter initialized in response to the reset signal, for performing counting in response to the counting clock signal and holding the counted value in response to the counting termination signal; and
    a comparing means for comparing the counted value of the counter with the first predetermined number and outputting the counting termination signal to the counter, the reset signal generating means, and the latching means in response to the compared result.

4. The apparatus of claim 2, wherein the clock signal generating means multiplies the frequency of a reference frequency clock signal by a predetermined number and outputs a signal having the multiplied frequency as the counting clock signal.

5. The apparatus of claim 2, wherein the first predetermined number is not more than 3T/T", where T is the period of a reference frequency clock signal and T" is the period of the counting clock signal.

6. The apparatus of claim 2, wherein the first predetermined number is of a value selected from the range of 4T/T"~10T/T", where T is the period of a reference frequency clock signal and T" is the period of the counting clock signal.

7. The apparatus of claim 2, wherein the first predetermined number is not more than 23.

8. The apparatus of claim 2, further comprising a noise removing means for processing the modulated signal received from the signal converting means, and for outputting the processed modulated signal to the full period compensating means, in response to a signal having a frequency obtained by dividing the frequency of a system clock signal by a predetermined number.

9. The apparatus of claim 2, wherein the period of the counting clock signal is not less than twice the smallest full period allowed for in the modulated signal.

10. The apparatus of claim 1, wherein the full period compensating means comprises:
    an edge detecting means for detecting the edge of the modulated signal and for outputting an edge signal;
    a reset signal generating means for outputting a reset signal in response to the edge signal or an initial reset signal;
    a counting means initialized in response to the reset signal, for counting a second predetermined number in response to a counting clock signal and for outputting a counting termination signal indicating the termination of counting;
    a clock signal generating means for generating the counting clock signal; and
    a signal selecting means for selectively outputting the modulated signal or an inverted modulated signal as the compensated modulated signal, in response to the counting termination signal.

11. The apparatus of claim 10, wherein the counting means comprises:
    a counter initialized in response to the reset signal, for performing counting in response to the counting clock signal and holding the counted value in response to the counting termination signal; and
    a comparing means for comparing the counted value of the counter with the second predetermined number and outputting the counting termination signal to the counter and the signal selecting means according to the compared result.

12. The apparatus of claim 11, wherein the reset signal generating means is reset in response to the counting termination signal.

13. The apparatus of claim 10, wherein the second predetermined number is not more than 89.

14. The apparatus of claim 1, wherein the full period comparing means comprises:

an edge detecting means for detecting the edge of the modulated signal and outputting an edge signal in response to the detection result;

reset signal generating means for outputting at least two reset signals, in response to the detected edge signal or an initial reset signal;

counting means initialized in response to a reset signal among the reset signals, for counting at least two predetermined numbers in response to a counting clock signal and outputting at least two counting termination signals indicating the termination of counting;

a clock signal generating means for generating the counting clock signal; and a compensated modulated signal generating means for generating a current compensated modulated signal, responding to the counting termination signals or the values counted by the counting means, and using the modulated signal and a previous compensated modulated signal previously output from the full period compensating means.

15. The apparatus of claim 14, wherein the reset signal generating means is reset in response to the counting termination signal.

16. The apparatus of claim 1, further comprising:

a signal delaying means for delaying the modulated signal output from the signal converting means for a predetermined time and outputting the delayed modulated signal to the full period compensating means;

a full period calculating means for calculating the full period of the modulated signal output from the signal converting means and outputting the calculated full period; and a full period error detecting means for detecting the errors of the calculated full period, wherein the full period compensating means compensates for errors in the full period of the modulated signal output from the signal delaying means, according to the detected errors.

17. The apparatus of claim 1, further comprising a first digital phase locked loop, for synchronizing the modulated signal input from the signal converting means with a master clock signal which changes according to the rotation speed multiple of the optical disk, and for outputting the synchronized modulated signal to the full period compensating means.

18. The apparatus of claim 17, further comprising a second digital phase locked loop for synchronizing the compensated modulated signal output from the full period compensating means with a master clock signal which changes according to the rotation speed multiple of the optical disk.

19. The apparatus of claim 1, further comprising a constant linear or constant angular velocity controlling means for controlling a rotation of the optical disk to the constant linear velocity or constant angular velocity by using the compensated modulated signal from the full period compensating means.

20. The apparatus of claim 1, wherein the full period of the compensated modulated signal used for a compact disk system is 3 to 11 times the period of a reference frequency clock signal.

21. The apparatus of claim 1, wherein the full period of the compensated modulated signal used for a digital video disk system is 3 to 14 times the period of a reference frequency clock signal.

22. The apparatus of claim 1 wherein the modulated signal is an eight-to-fifteen (EFM) modulated signal.

23. The apparatus of claim 1 further comprising an error correction means for correcting the errors of the compensated modulated signal.

24. A method of operating an optical disk reading apparatus adapted for full period error compensation, comprising:

converting an optical signal reflected from an optical disk into an electrical signal;

obtaining a modulated signal by converting the analog electrical signal into a digital signal; and obtaining a compensated modulated signal by compensating for errors in the full periods of the modulated signal by counting the duration of the error and compensating for the error based on the duration.

25. The method of claim 24, wherein obtaining a compensated modulated signal comprises the steps of:

determining whether the errors of the full periods of the modulated signal are to be compensated;

determining the currently input modulated signal as the compensated modulated signal, if the errors of full periods are to be compensated;

detecting the edge of the modulated signal;

counting a count value of counting clock signals, following detection of the edge of the modulated signal;

determining a previous compensated modulated signal to be a current compensated modulated signal, until the count value has reached a first predetermined number; and determining the current modulated signal to be the current compensated modulated signal, when the count value reaches the first predetermined number.

26. The method of claim 24, wherein obtaining a compensated modulated signal comprises:

determining whether the errors of full periods of the modulated signal are to be compensated;

determining the currently input modulated signal as the compensated modulated signal, if the errors of full periods are to be compensated;

detecting an edge of the modulated signal;

counting a count value of counting clock signals following detection of the edge of the modulated signal;

determining the modulated signal to be the compensated modulated signal, until the value has reached a first predetermined number;

inverting the modulated signal and determining the inverted modulated signal to be the compensated modulated signal, when the count value has reached the first predetermined number.

27. The method of claim 26 further comprising correcting the errors of the compensated modulated signal using an error correcting code.

* * * * *